(12) United States Patent
Freres

(10) Patent No.: US 10,464,294 B2
(45) Date of Patent: *Nov. 5, 2019

(54) WOOD PANEL ASSEMBLIES AND METHODS OF PRODUCTION

(71) Applicant: Freres Lumber Co., Inc., Lyons, OR (US)

(72) Inventor: Tyler Freres, Lyons, OR (US)

(73) Assignee: FRERES LUMBER CO., INC., Lyons, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,025

(22) Filed: Feb. 23, 2018

(65) Prior Publication Data

US 2018/0250920 A1 Sep. 6, 2018

Related U.S. Application Data

(63) Continuation-in-part of application No. 15/271,136, filed on Sep. 20, 2016, now Pat. No. 10,131,119.

(Continued)

(51) Int. Cl.
*B32B 21/13* (2006.01)
*B32B 3/06* (2006.01)
(Continued)

(52) U.S. Cl.
CPC .............. *B32B 21/13* (2013.01); *B27D 1/04* (2013.01); *B32B 3/06* (2013.01); *B32B 7/03* (2019.01);
(Continued)

(58) Field of Classification Search
CPC .............. Y10T 428/18; Y10T 428/183; Y10T 428/187; Y10T 428/197; Y10T 428/24132;
(Continued)

(56) References Cited

U.S. PATENT DOCUMENTS 2,302,962 A 11/1942 Laucks
2,729,584 A 1/1956 Foster
(Continued)

FOREIGN PATENT DOCUMENTS

CN 2887553 Y 4/2007
EP 2705950 A1 3/2014
(Continued)

OTHER PUBLICATIONS

Serrano et al., Compression Strength Perpendicular to Grain in Cross-Laminated Timber (CLT), http://www.diva-portal.org/smash/get/diva2:330397/fulltext01, World Conference on Timber Engineering; 2010; 8 pages.
(Continued)

*Primary Examiner* — Alexander S Thomas
(74) *Attorney, Agent, or Firm* — Schwabe Williamson & Wyatt, PC

(57) ABSTRACT

Disclosed is a mass plywood panel assembly including at least two engineered wood panel assemblies. Each wood panel assembly includes a first layer including a first set of billets, a second layer including a second set of billets and a third layer including a third set of billets of sheets. The first set of billets, the second set of billets, and the third set of billets are all oriented longitudinally along the length of the wood panel assembly and the at least two engineered wood panel assemblies are connected by an end joint, thereby forming the mass plywood panel assembly. Methods of manufacturing mass plywood panel assemblies are also disclosed.

8 Claims, 29 Drawing Sheets

Related U.S. Application Data

(60) Provisional application No. 62/288,325, filed on Jan. 28, 2016, provisional application No. 62/244,650, filed on Oct. 21, 2015.

(51) Int. Cl.

| | | |
|---|---|---|
| *B32B 37/06* | (2006.01) | |
| *B32B 7/12* | (2006.01) | |
| *B32B 21/14* | (2006.01) | |
| *B32B 7/03* | (2019.01) | |
| *B27D 1/04* | (2006.01) | |

(52) U.S. Cl.
CPC ............... *B32B 7/12* (2013.01); *B32B 21/14* (2013.01); *B32B 37/06* (2013.01); *Y10T 428/18* (2015.01)

(58) Field of Classification Search
CPC . Y10T 428/24066; B32B 21/13; B32B 21/14; B32B 3/14; B32B 3/18; E04C 3/122; E04C 3/14
See application file for complete search history.

(56) References Cited

U.S. PATENT DOCUMENTS

| | | | |
|---|---|---|---|
| 3,229,433 | A | 1/1966 | Miles |
| 4,012,548 | A | 3/1977 | Roberti |
| 4,131,705 | A | 12/1978 | Kubinsky |
| 4,413,459 | A | 11/1983 | Lambuth |
| 4,543,284 | A | 9/1985 | Baum |
| 4,569,873 | A | 2/1986 | Robbins |
| 5,041,322 | A | 8/1991 | Fouquet |
| 5,425,976 | A | 6/1995 | Clarke et al. |
| 5,506,026 | A | 4/1996 | Iwata et al. |
| 6,004,648 | A | 12/1999 | Snyder |
| 6,162,312 | A | 12/2000 | Abney |
| 6,468,643 | B1 | 10/2002 | Kanbayashi et al. |
| 7,498,077 | B2 | 3/2009 | Joseph et al. |
| 8,202,389 | B2 | 6/2012 | Handojo |
| 8,895,125 | B2 | 11/2014 | Fischer et al. |
| 8,927,085 | B2 | 1/2015 | Burton |
| 10,131,119 | B2 | 11/2018 | Freres |
| 2007/0193179 | A1 | 8/2007 | Risi |
| 2009/0181209 | A1 | 7/2009 | Zheng et al. |
| 2012/0077011 | A1 | 3/2012 | Bosson |
| 2013/0316124 | A1 | 11/2013 | Utsumi |
| 2014/0329047 | A1 | 11/2014 | Coronado |
| 2014/0370231 | A1 | 12/2014 | Wallace |
| 2017/0113442 | A1 | 4/2017 | Freres |

FOREIGN PATENT DOCUMENTS

| | | |
|---|---|---|
| EP | 3365169 | 8/2018 |
| FR | 2790416 A1 | 9/2000 |
| JP | 50-107105 | 8/1975 |
| JP | S50107105 A | 8/1975 |
| JP | 52-029839 | 3/1977 |
| JP | S56163271 A | 12/1981 |
| JP | 59-222301 | 12/1984 |
| JP | S59222301 A | 12/1984 |
| JP | H06285810 A | 10/1994 |
| JP | S52029839 U | 3/1997 |
| JP | 2004082588 A | 3/2004 |
| JP | 200812672 A | 6/2008 |
| JP | 2008126572 A | 6/2008 |
| JP | 3177561 U | 8/2012 |
| JP | 2019500232 A | 1/2019 |
| WO | 92/10311 | 6/1992 |
| WO | 1992010311 A1 | 6/1992 |
| WO | 97/44168 A1 | 11/1997 |
| WO | 2005/021256 A1 | 3/2005 |
| WO | 2005021256 A1 | 3/2005 |
| WO | 2014/111425 A1 | 7/2014 |
| WO | 2014111425 A1 | 7/2014 |
| WO | 2017/069905 A1 | 4/2017 |

OTHER PUBLICATIONS

Big River Bridgeply Design and Installation Manual 2017; 27 pages.
Boral Plywood Handbook Jul. 2009; 36 pages.
Serrano et al., "Compression Strength Perpendicular to Grain in Cross-Laminated Timber (CLT)" World Conference on Timber Engineering (2010); 8 pages.
International Search Report and Written Opinion for PCT/US2016/053064 dated Nov. 29, 2016; 11 pages.

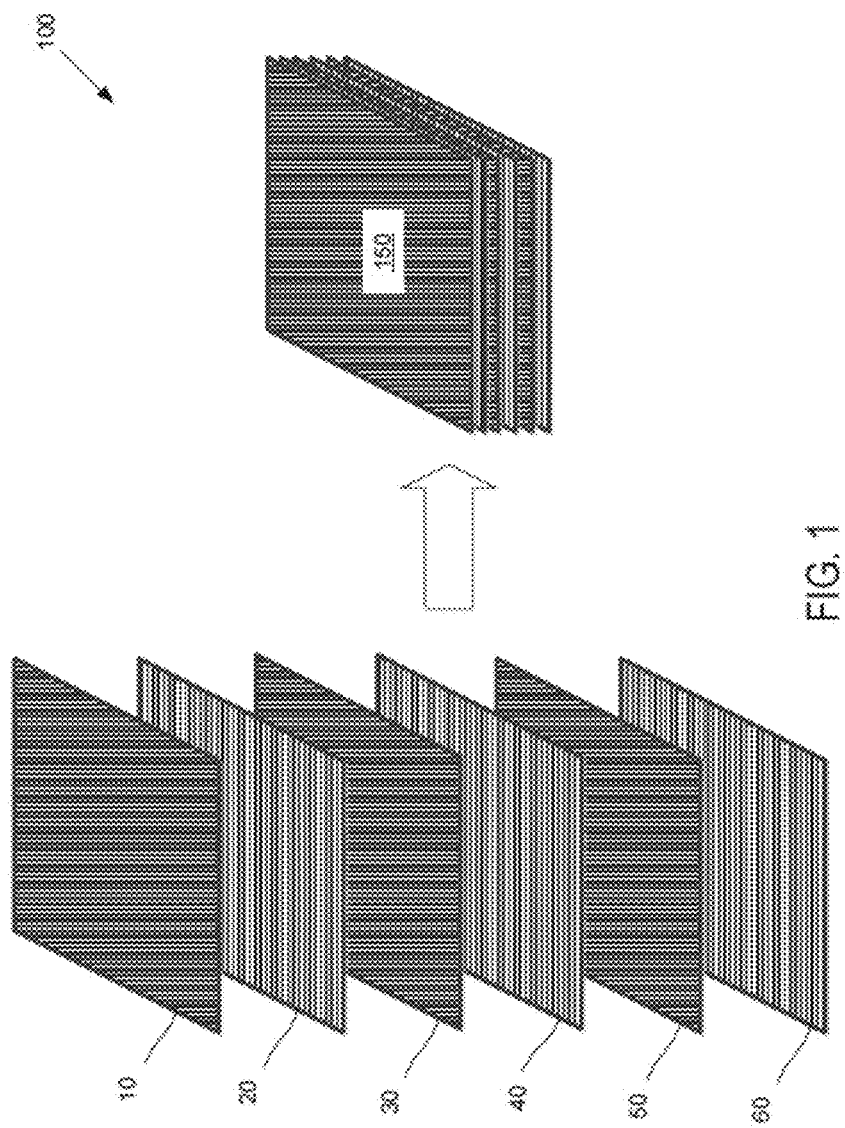

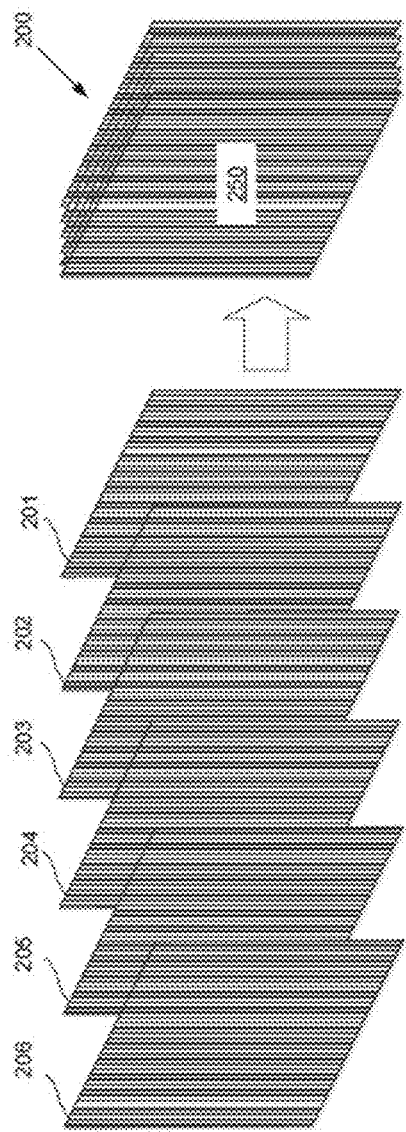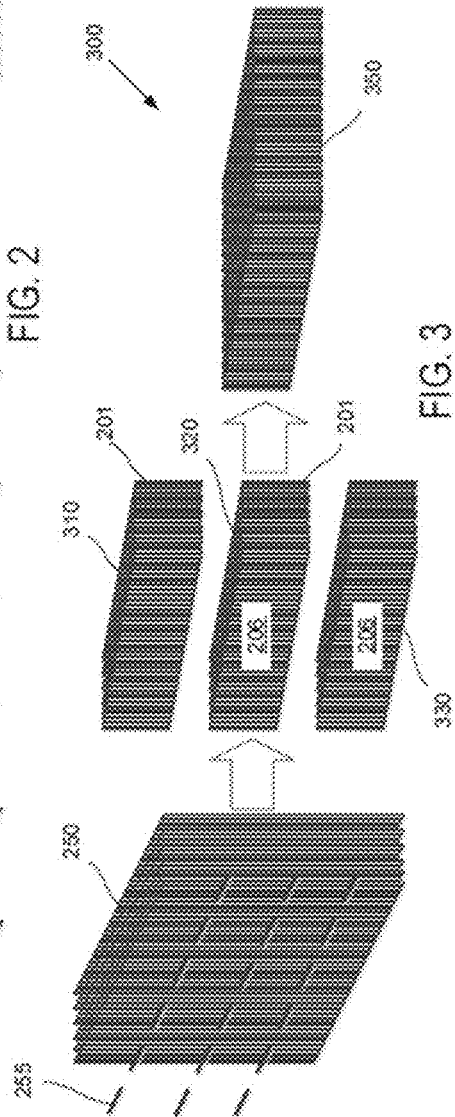

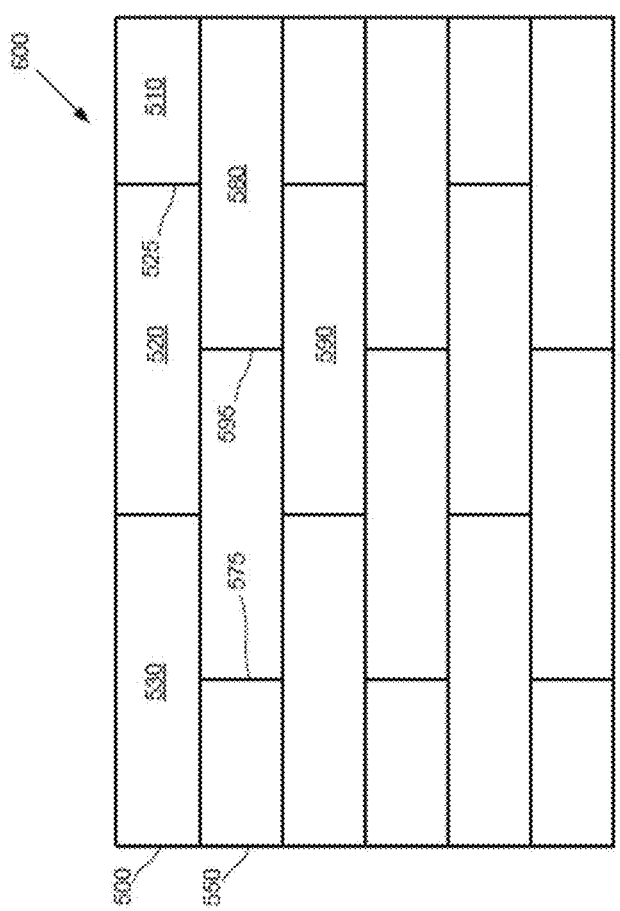

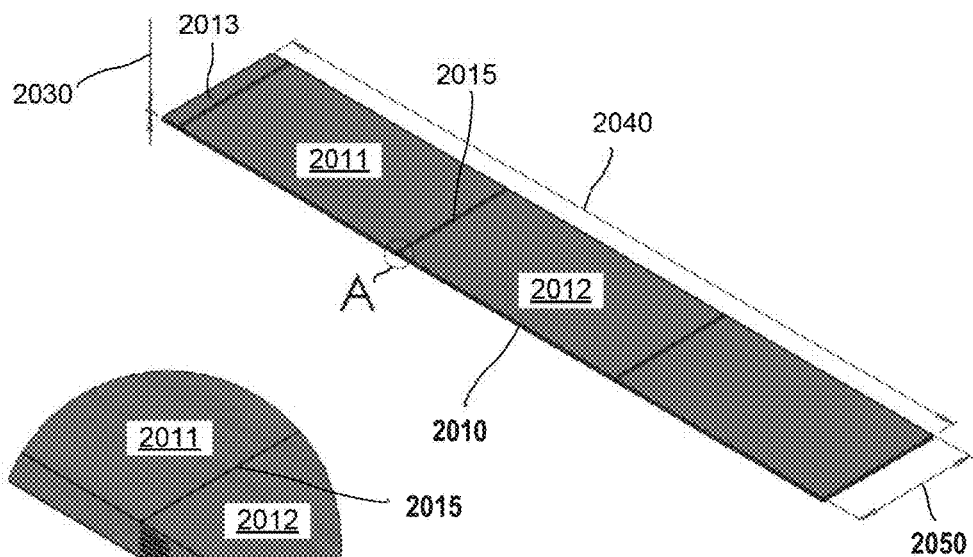
FIG. 19A
FIG. 19B
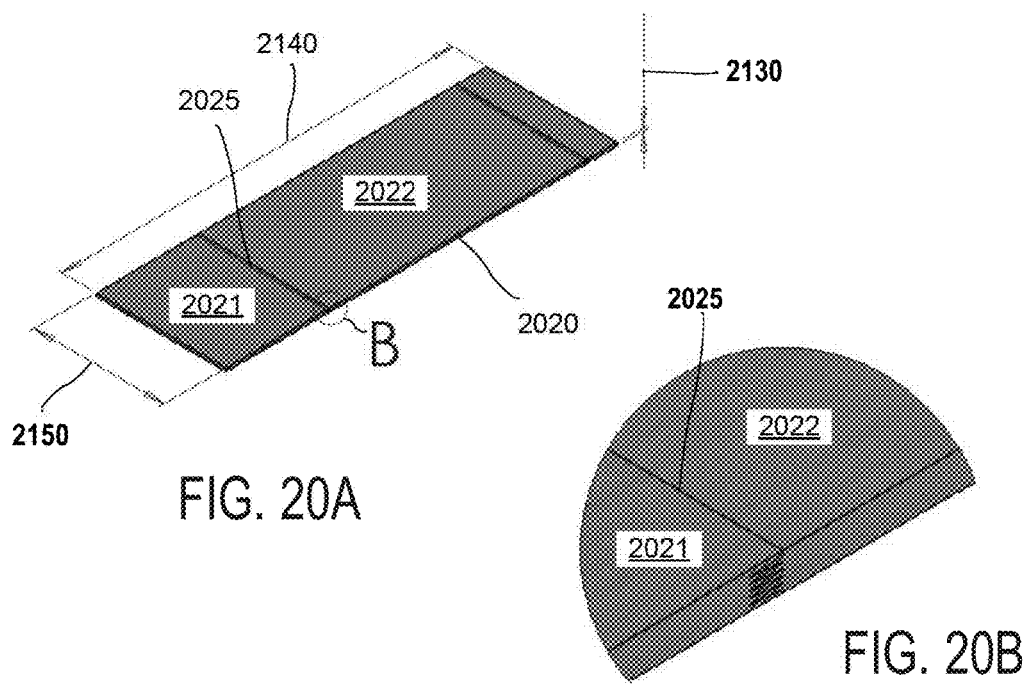
FIG. 20A
FIG. 20B

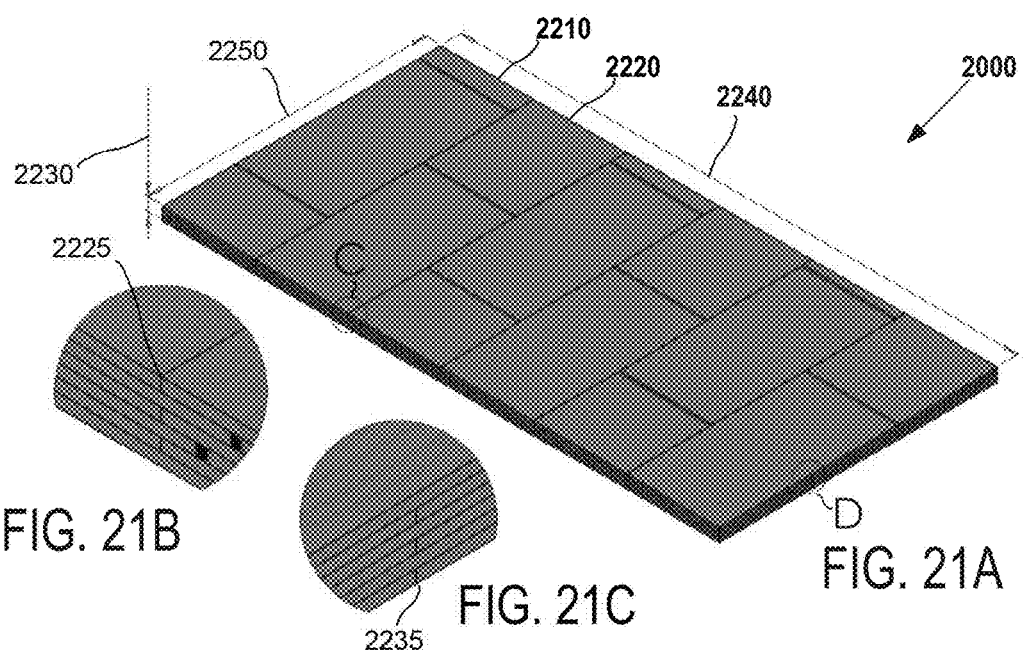
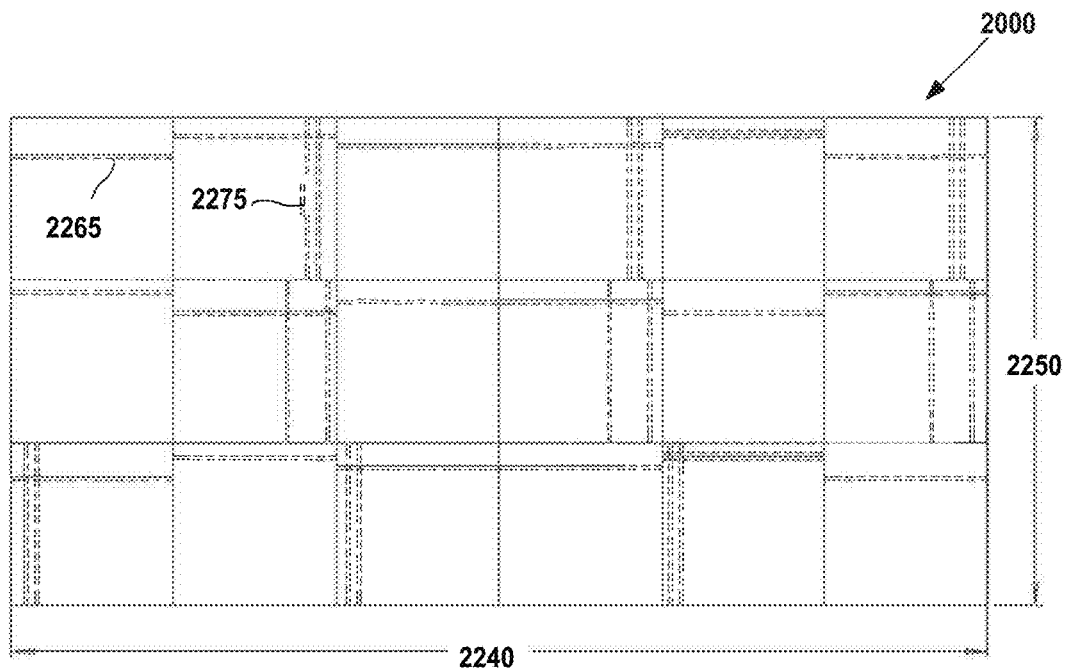
FIG. 22

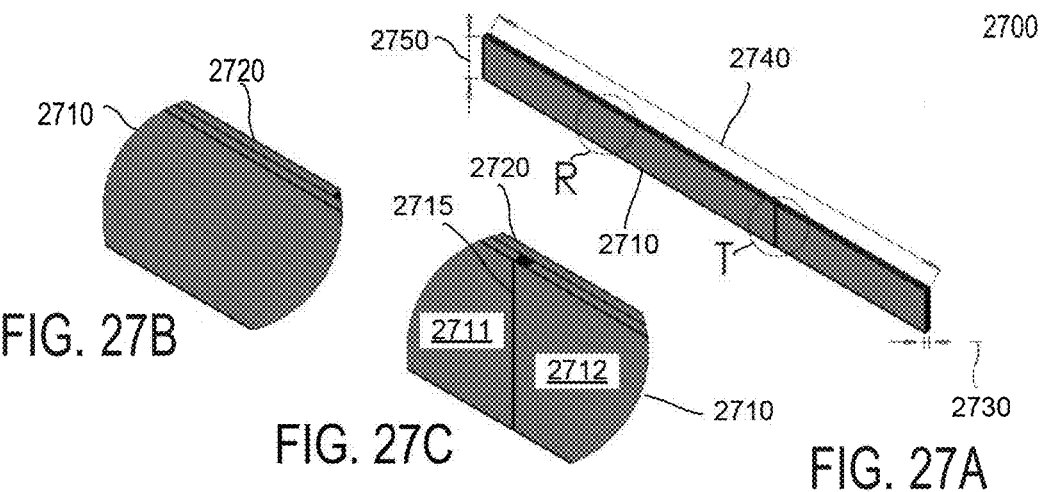
FIG. 27B
FIG. 27C
FIG. 27A
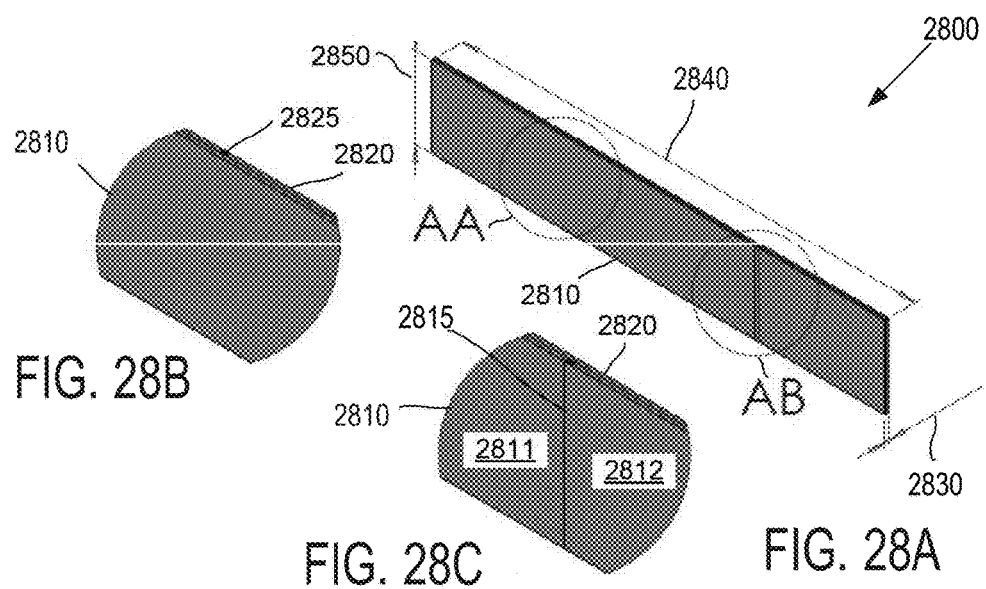
FIG. 28B
FIG. 28C
FIG. 28A

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|
| 2.2 | 2.2 | 2.2 | | | | | | | | | | | | | | | | | |
| 2.2 | 1.0 | 1.0 | 2.2 | | | | | | | | | | | | | | | | |
| 2.2 | 2.2 | 1.0 | 2.2 | 2.2 | | | | | | | | | | | | | | | |
| 2.2 | 2.2 | 1.0 | 1.0 | 2.2 | 2.2 | | | | | | | | | | | | | | |
| 2.2 | 2.2 | 1.0 | 1.0 | 1.0 | 2.2 | 2.2 | | | | | | | | | | | | | |
| 2.2 | 2.2 | 1.0 | 1.0 | 1.0 | 1.0 | 2.2 | 2.2 | | | | | | | | | | | | |
| 2.2 | 2.2 | 2.2 | 1.0 | 1.0 | 1.0 | 2.2 | 2.2 | 2.2 | | | | | | | | | | | |
| 2.2 | 2.2 | 2.2 | 1.0 | 1.0 | 1.0 | 1.0 | 2.2 | 2.2 | 2.2 | | | | | | | | | | |
| 2.2 | 2.2 | 2.2 | 1.0 | 1.0 | 1.0 | 1.0 | 2.2 | 2.2 | 2.2 | | | | | | | | | | |
| 2.2 | 2.2 | 1.0 | 1.0 | 1.0 | 1.0 | 1.0 | 1.0 | 2.2 | 2.2 | 2.2 | | | | | | | | | |
| 2.2 | 2.2 | 2.2 | 1.0 | 1.0 | 1.0 | 1.0 | 1.0 | 1.0 | 2.2 | 2.2 | 2.2 | | | | | | | | |
| 2.2 | 2.2 | 2.2 | 2.2 | 1.0 | 1.0 | 1.0 | 1.0 | 1.0 | 1.0 | 2.2 | 2.2 | 2.2 | | | | | | | |
| 2.2 | 2.2 | 2.2 | 2.2 | 1.0 | 1.0 | 1.0 | 1.0 | 1.0 | 1.0 | 1.0 | 2.2 | 2.2 | 2.2 | | | | | | |
| 2.2 | 2.2 | 2.2 | 2.2 | 1.0 | 1.0 | 1.0 | 1.0 | 1.0 | 1.0 | 1.0 | 2.2 | 2.2 | 2.2 | 2.2 | | | | | |
| 2.2 | 2.2 | 2.2 | 2.2 | 2.2 | 1.0 | 1.0 | 1.0 | 1.0 | 1.0 | 1.0 | 2.2 | 2.2 | 2.2 | 2.2 | 2.2 | | | | |
| 2.2 | 2.2 | 2.2 | 2.2 | 2.2 | 1.0 | 1.0 | 1.0 | 1.0 | 1.0 | 1.0 | 1.0 | 2.2 | 2.2 | 2.2 | 2.2 | 2.2 | | | |
| 2.2 | 2.2 | 2.2 | 2.2 | 2.2 | 1.0 | 1.0 | 1.0 | 1.0 | 1.0 | 1.0 | 1.0 | 2.2 | 2.2 | 2.2 | 2.2 | 2.2 | 2.2 | | |
| 2.2 | 2.2 | 2.2 | 2.2 | 2.2 | 1.0 | 1.0 | 1.0 | 1.0 | 1.0 | 1.0 | 1.0 | 1.0 | 2.2 | 2.2 | 2.2 | 2.2 | 2.2 | 2.2 | |

FIG. 31

WOOD PANEL ASSEMBLIES AND METHODS OF PRODUCTION

CROSS REFERENCE TO RELATED APPLICATIONS

This application is a Continuation-in-Part of U.S. application Ser. No. 15/271,136, filed Sep. 20, 2016, which issued on Nov. 20, 2018 as U.S. Pat. No. 10,131,119, which claims priority to both U.S. Provisional Application No. 62/244,650, filed on Oct. 21, 2015, and U.S. Provisional Application No. 62/288,325, filed on Jan. 28, 2016, each of which is herein incorporated by reference it its entirety.

TECHNICAL FIELD

This disclosure relates to engineered wood panel assemblies and methods of constructing such assemblies, including mass plywood panel assemblies, structural composite lumber (SCL) and other types of wood products.

BACKGROUND

Laminated timber products, e.g., which may refer to a two-by-four inch, two-by-six inch or other cross-sectional wood cuttings, may be attached to each other to form an engineered beam for certain types of construction applications, such as replacements for metal beams in buildings. While providing improved strength as compared to a single, larger piece of lumber, the lumber used to manufacture the engineered beams nevertheless have an associated weight which affects its efficiency and viability as a replacement for metal beams, particularly in larger construction projects such as a building which may be several, or even ten or more stories in height.

As a result of the relative thickness of the lumber, it may take a relatively large amount of time and care to create even and thorough drying of the lumber within manufacturing tolerances. Additionally, the wood in the lumber may tend to revert or regain the original shape of the wood as found in nature, potentially creating characteristics such as cupping, skewing and/or twisting of the resultant products. Defects in the wood such as knots can substantially weaken lumber assemblies, however removal of knots require additional cutting and joints in the finished product.

Wood products manufactured out of laminated timber, such as cross laminated timber (CLT) panels, are typically restricted to an odd number of layers, e.g., three-ply, five-ply, or seven-ply, as a result of the relatively large minimum thickness of each layer (general one and one-half inches thick). The limitations on the ability to vary the thickness of the wood products therefore require overall building designs to similarly be limited in design and configuration. This application addresses these and other problems.

SUMMARY

An engineered wood panel assembly is disclosed herein. The assembly may comprise a first layer including a first set of billets that abut against each other along a lengthwise edge of the billets. Each billet may comprise a joint connecting adjacent sheets within the billet, and the joint may be oriented perpendicular to the lengthwise edge. Each of the sheets in the first layer may include a number of veneer plies with at least one ply comprising wood grain oriented in a first direction.

A second layer of the assembly may include a second set of billets of sheets that are layered on top of the first layer. Each billet in the second set may comprise an additional joint connecting adjacent sheets, and the additional joint may be oriented perpendicular to a lengthwise edge of the second set of billets. The additional joint in the second layer may be offset from the joint in the first layer, and each of the sheets in the second layer may include a number of veneer plies with at least one ply comprising wood grain oriented in a second direction perpendicular to the first direction.

Additionally, a third layer of the assembly may include a third set of billets of sheets that are layered on top of the second layer. The third set of billets may include a number of veneer plies with at least one ply comprising wood grain oriented in the first direction, and each billet in the third set may comprise another joint connecting adjacent sheets. The other joint in the third layer may be offset from both the additional joint in the second layer and the joint in the first layer.

A method of manufacturing a wood panel assembly is disclosed herein. The method may comprise forming a first billet comprising two or more sheets connected together at a first joint. Each of the sheets in the first billet may include a number of veneer plies with at least one ply comprising wood grain oriented in a first direction. A second billet comprising two or more sheets connected together at a second joint may also be formed. Each of the sheets in the second billet may include a number of veneer plies with at least one ply comprising wood grain oriented in the first direction. The second billet may be placed next to the first billet along a lengthwise edge of each billet to form a first layer of the wood panel assembly, and the lengthwise edge may be perpendicular to both the first joint and the second joint. Additionally, the first joint may be longitudinally offset from the second joint after forming the first layer.

The method may comprise forming a third billet including two or more sheets connected together at a third joint. Each of the sheets in the third billet may include a number of veneer plies with at least one ply comprising wood grain oriented in a second direction perpendicular to the first direction. A fourth billet comprising two or more sheets connected together at a fourth joint may also be formed. Each of the sheets in the fourth billet may include a number of veneer plies with at least one ply comprising wood grain oriented in the second direction.

The fourth billet may be placed next to the third billet along a lengthwise edge of each billet to form a second layer of the wood panel assembly, and the fourth joint may be longitudinally offset from the third joint after forming the second layer. The second layer may be attached to the first layer with an adhesive material. In some examples, a third layer including additional billets may be layered on top of the second layer.

Also disclosed herein are mass plywood panel (MPP) assemblies and structural composite lumber (SCL) assemblies. In some embodiments, the maximum finished dimension of a MPP assembly is up to 60 feet long and between 1 and 48 inches thick. It is contemplated that the disclosed assemblies can be used for a variety of support structures, including, but not limited to walls, floors, beams and/or columns. In some embodiments, a disclosed SCL assembly includes an all parallel veneer layup without alternating the direction of the primary lamellas and still achieving necessary force direction strength (long-span bending) and minor force direction (cross-span bending).

The foregoing and other features of the disclosure will become more apparent from the following detailed description, which proceeds with reference to the accompanying figures.

BRIEF DESCRIPTION OF DRAWINGS

FIG. 1 illustrates an example process for manufacturing a multi-layered plywood assembly.

FIG. 2 illustrates an example process for manufacturing a multi-layered plywood assembly with grain oriented in a vertical orientation.

FIG. 3 illustrates an example process for manufacturing a vertically oriented grain plywood assembly comprising cut portions of the multi-layered plywood assembly of FIG. 2.

FIG. 6 illustrates an end view of a finished panel construction comprising six alternating layouts.

FIG. 19A illustrates an isometric view of an example row of sheets, or billet, arranged in a longitudinal orientation.

FIG. 19B illustrates an exploded view of Point A on FIG. 19A.

FIG. 20A illustrates an isometric view of an example transverse row of sheets, or transverse billet, arranged in a transverse, or lateral orientation.

FIG. 20B illustrates an exploded view of Point B on FIG. 20A.

FIG. 21A illustrates an isometric view of an example panel assembly comprising the rows of sheets of FIGS. 19A and 20A configured in a cross-panel construction.

FIG. 21B illustrates an exploded view of Point C on FIG. 21A.

FIG. 21C illustrates an exploded view of Point D on FIG. 21A.

FIG. 22 illustrates a top view of the example panel assembly of FIG. 21A.

FIG. 27A illustrates an isometric view of an example joist assembly comprising two layers of billets.

FIG. 27B illustrates an exploded view of Point R on FIG. 27A.

FIG. 27C illustrates an exploded view of Point T on FIG. 27A.

FIG. 28A illustrates an isometric view of an example rim-board assembly comprising two layers of billets.

FIG. 28B illustrates an exploded view of Point AA on FIG. 28A.

FIG. 28C illustrates an exploded view of Point AB on FIG. 28A.

FIG. 31 illustrates a panel layout in accordance with an embodiment disclosed herein.

DESCRIPTION

Figure 4:
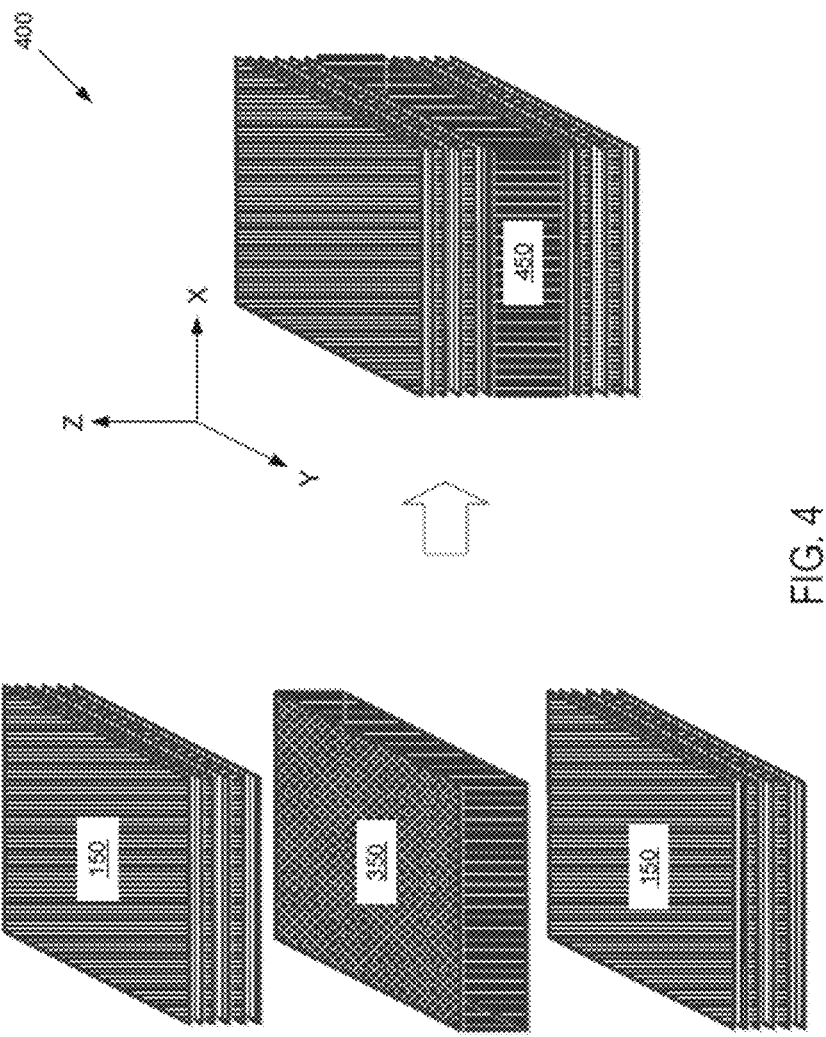
FIG. 4 illustrates an example process for manufacturing a multi-layered plywood assembly comprising alternating layers of the plywood assembly of FIG. 1 and the vertically oriented grain plywood assembly of FIG. 3.

Plywood may be made from a number of layers of veneer which are peeled off from a tree, such that original wood grain is maintained in each layer of plywood. The grain of the wood has a generally linear direction, and in some types of plywood, the grains of adjacent layers of the plywood are oriented in a perpendicular manner.

Laminated veneer lumber (LVL) may similarly comprise a number of layers of veneer which are adhered together; however, instead of orienting adjacent layers in a perpendicular manner, all the layers of veneer may be oriented so that the wood grain is aligned with each other, e.g., along the longitudinal direction of the veneer sheet. Orienting the wood grain along a common alignment may operate to increase the strength and/or support of the sheet along the length of the grain, but may provide less support in a direction lateral to the grain, as compared to plywood for example.

Cross Laminated Timber panels (CLT) may consist of alternating layers of lumber, oriented to provide both lateral and longitudinal support to a panel. CLT may be used in the construction of multi-story wood-based construction, in some cases up to fifteen stories tall. CLT primarily relies on using lumber as a base commodity product for producing engineered quality construction. Some of the products and production methods described herein may be understood to disclose a competing product to CLT. However instead of using lumber, example manufactured wood structures disclosed herein may comprise laminated plywood or structural composite lumber panels in the production of panels having comparable structural integrity as CLT, but with less weight and/or less material.

Disclosed herein are mass plywood panel (MPP) assemblies. In some embodiments, the maximum finished dimension of a MPP assembly is up to 48 and ½ feet, such as 8 feet, 12 feet, 16 feet, 20 feet, 24 feet, 28 feet, 32 feet, 36 feet, 40 feet, 44 feet or 48 feet, and up to twenty-four inches thick, such as between 1 inch and 24 inches, such as 1 inch, 1.5 inches, 2 inches, 3 inches, 4 inches, 5 inches, 6 inches, 7 inches, 8 inches, 9 inches, 10 inches, 11 inches, 12 inches 13 inches, 14 inches, 15 inches, 16 inches, 17 inches, 18 inches, 19 inches, 20 inches, 21 inches, 22 inches, 23 inches, or 24 inches. In some embodiments, the MPP assembly is up to sixty feet long, such as between 8 feet and 60 feet, 12 feet and 48 feet, and forty-eight inches thick, such as between 1 and 48 inches, 1 and 24 inches. In some examples the MPP assembly is at least 12 feet long, such as at least 16 feet, at least 20 feet, at least 24 feet, at least 32 feet, at least 48 feet and at least 4 feet wide, such as at least 8 feet, at least 10 feet, at least 12 feet, at least 16 feet, at least 20 feet, at least 24 feet wide. Panels may be customized to fit specific projects and can be constructed in one-inch thick increments to provide superior strength and performance over lumber. It is contemplated that the disclosed assemblies can be used for a variety of structures, including, but not limited to walls, floors, beams and/or columns. In some examples, the disclosed assemblies are used for wailing and shoring for concrete projects, concrete tilt-up structure replacement or crane mats. A few of the advantages associated with the disclosed panel assemblies are the following: (1) reduce on-site labor by using pre-fabricated panels; (2) reduce construction time when used in place of concrete and steel; (3) offset one ton atmospheric carbon for each cubic meter used in place of concrete; provide versatility to create platforms for engineering requirements; (4) utilize trees efficiently with less waste than traditional lumber processing (10% loss with disclosed process compared to 40%); (5) meet or exceed structural characteristics of CLT with less fiber, such as between 2%-20% less fiber, including 10% to 20% less; and (6) in contrast to veneer where the cross-section of a defect is limited to the thickness of the veneer, with timbers, the defect can be as big as the timber is thick and for end jointing, defects need not be removed. In some embodiments, the resulting assembly has no defect within the surface of greater than ⅛ of an inch.

In some particular embodiments, a disclosed MPP assembly includes two or more structural composite lumber (SCL) assemblies. In some examples, each structural composite lumber (SCL) assembly includes an all parallel veneer layup without alternating the direction of the primary lamellas and still achieving necessary force direction strength (long-span bending) and minor force direction (cross-span bending). For example, a disclosed 3-inch or 6-inch MPP assembly has a modulus of elasticity (MOE) of 1.8, fiber stress in bending (FB) of 2100 psi, and a horizontal sheer (FV) of 10 psi. The resulting assembly has no defect within the surface of greater than ⅛ of an inch. In some examples, methods of manufacturing a MPP assembly include connecting a first SCL assembly to a second SCL assembly with an adhesive with a hot press and then using a scarf joint to further connect the two together with a radio frequency (RF) press for a desired length. FIG. 1 illustrates an example process 100 for manufacturing a multi-layered plywood assembly 150 comprising six layers or plies of plywood arranged in alternating grain orientations. For example, three "odd" plies 10, 30, and 50 comprising a substantially vertical grain orientation may be interleaved with three "even" plies 20, 40, 60 comprising a substantially horizontal grain orientation. The plies may be glued together to form the plywood assembly 150. For example, the contact surface between adjacent plies may be coated with glue or resin, compressed together, and allowed to dry.

The grain of the wood in any one ply may be oriented in a generally linear direction. Additionally, the grain of wood for any one ply, such as a second ply 20, may be oriented substantially perpendicular to the grain orientation of adjacent plies, such as a first ply 10 and a third ply 30.

In some examples, the grain of wood associated with an upper ply, such as first ply 10, may be substantially perpendicular to the lower ply, such as a sixth ply 60. In other example plywood assemblies, the grain of wood in the upper ply and the lower ply may be substantially parallel, such as in a plywood assembly comprising five ply of plywood including first ply 10 and a ply layer 50.

FIG. 2 illustrates an example process 200 for manufacturing a multi-layered plywood assembly 250 with wood grain oriented in a substantially vertical orientation. The plywood assembly 250 may comprise a plurality of layers or plies of plywood and in some examples may comprise six plies 201, 202, 203, 204, 205, and 206. The six plies may be glued together to form the plywood assembly 150.

FIG. 3 illustrates an example process 300 for manufacturing a vertically oriented grain plywood assembly 350 comprising cut portions of the multi-layered plywood assembly 250 of FIG. 2. For example, the plywood assembly 250 may be cut 255 across the grain to form shortened pieces, such as a first piece 310, a second piece 320, and a third piece 330. The pieces may be substantially identical to each other in width, height, length, and grain orientation.

Process 300 may comprise gluing and/or compressing the pieces together, so that a side of first piece 310, corresponding to first ply 201 (FIG. 2), may be adhered to a first side of second piece 310 corresponding to sixth ply 206 (FIG. 2), and similarly a second side of second piece 320 corresponding to first ply 201 may be adhered to a side of third piece 330 corresponding to ply layer 206. In a process in which six sheets of plywood are cut into three shortened pieces, the example plywood assembly 350 may comprise eighteen shortened pieces of plywood stacked together with the wood grain all oriented in the generally vertical direction.

In some examples, instead of cutting plywood assembly 250, the manufacturing process may comprise cutting the plywood assembly 150 of FIG. 1 to form shortened pieces which may be stacked together, similar to assembly 350. Each layer of the shortened pieces which are glued together in the vertical orientation may have alternating, or perpendicular, grain patterns as compared to the adjacent layers.

FIG. 4 illustrates an example process 400 for manufacturing a multi-layered plywood assembly 450 comprising alternating layers of plywood assembly 150 of FIG. 1 and plywood assembly 350 of FIG. 3. The plywood assembly 150 of FIG. 1 may be alternated with plywood assembly 350 of FIG. 3 such that the resulting cross-laminated plywood product 450 includes layers of plywood with wood grain oriented in three orthogonal directions "X", "Y" and "Z". For example, the alternating layers of plywood in assembly 150 may comprise wood grain in the "X" and "Y" orientations, and the layers of plywood in assembly 350 may comprise wood grain in the "Z" orientation.

Each ply of plywood in assembly 350 may comprise wood grain oriented perpendicular to the wood grain associated with the adjacent plies, with the wood grain alternating between one of three orthogonal directions. By including wood grain in three orthogonal directions, plywood assembly 350 may also be configured to resist bending moments in virtually any direction, e.g., with respect to moments taken about one or all three of the "X", "Y" and "Z" axes.

Large format panels, e.g., twelve feet wide by forty plus feet long, may be composed of pre-manufactured veneer and/or plywood panels including one of more of the wood assemblies illustrated in FIG. 4. The panels may be constructed to desired thickness or load bearing requirements based upon end use.

Figure 5A:
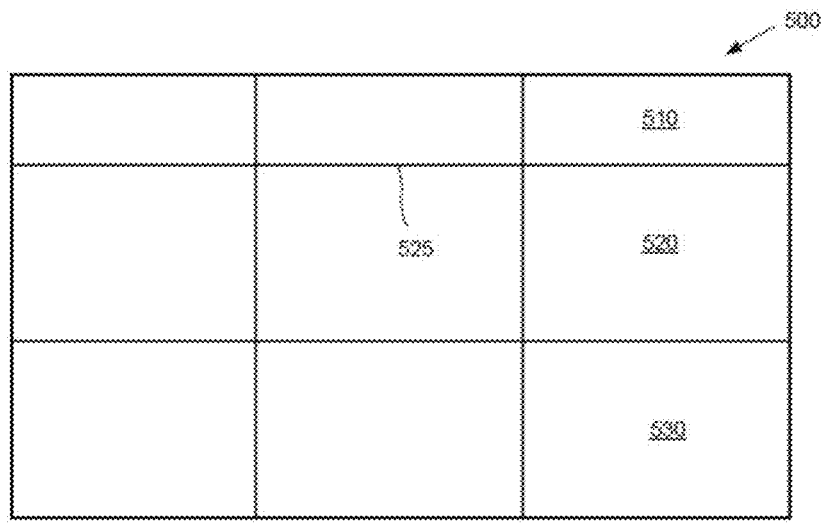
FIG. 5A illustrates a first example panel layout comprising a first joint configuration.

FIG. 5A illustrates a first example panel layout 500 comprising a first joint configuration. First panel layout 500 is illustrated as comprising three panel rows, or billets. One row of panels may comprise a first sheet 510 having a width which is approximately half the width of the other two panel rows. For example, the first sheet 510 may comprise a sheet of plywood or veneer which measures two feet wide by eight feet long. The other two panel rows may comprise a second sheet 520 and a third sheet 530 which measure four feet wide by eight feet long. Accordingly, the panel layout 500 may be approximately ten feet wide by twenty-four feet long by way of illustrative example only.

Each row of panels may comprise two longitudinal edges, which may extend along the entire length of the panel layout 500. The row of panels comprising first sheet 510 may be associated with a panel edge 525. Similarly, a second row of panels comprising second sheet 520 may comprise a panel edge which abuts panel edge 525 in the panel layout 500. Panel edge 525 may be considered an internal panel edge, in that panel edge 525 may be located in the interior of panel layout 500.

Figure 5B:
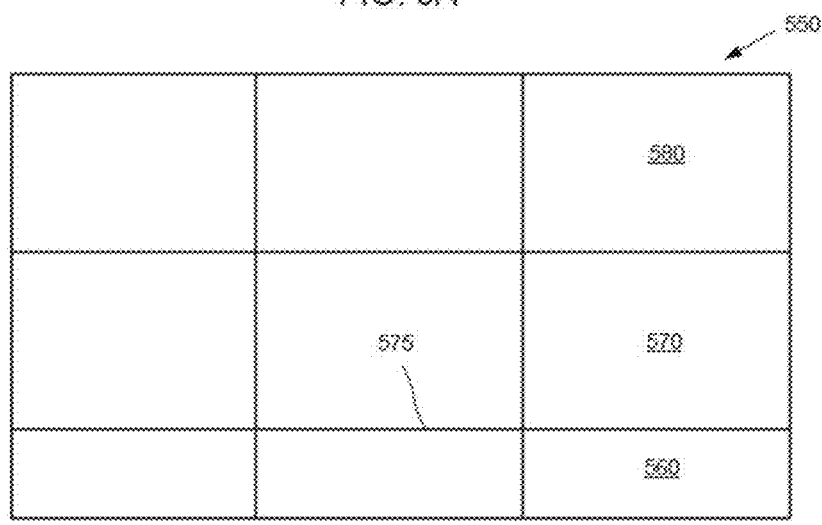
FIG. 5B illustrates a second example panel layout comprising a second joint configuration.

FIG. 5B illustrates a second example panel layout 550 comprising a second joint configuration. Second panel layout 550 is illustrated as comprising three panel rows, or billets. One row of panels may comprise a first sheet 560 having a width which is approximately half the width of the other two panel rows. For example, the first sheet 560 may comprise a sheet of plywood or veneer which measures two feet wide by eight feet long. The other two panel rows may comprise a second sheet 570 and a third sheet 580 which measure four feet wide by eight feet long. Accordingly, the panel layout 550 may be approximately ten feet wide by twenty-four feet long, by way of illustrative example only. In some examples panel layout 550 may have the same overall dimensions as panel layout 500 of FIG. 5A. The row of panels comprising first panel 560 may be associated with an internal panel edge 575.

The construction of one or more types of panels may be facilitated by creating and/or using a thirty-two feet (or longer) feedstock, including, but not limited to, thirty-two feet, forty-feet, or forty-eight feet. For example, the panels or mats may be oriented so that each mat is made up of one panel that is two feet wide by forty-feet long and two panels that are four feet wide by forty-eight feet long, arranged side by side to create a ten feet wide panel. In some examples, a scarf joint, finger-joint, or structurally equivalent joined panel may be used in order to make the thirty-two feet plus length. For a twelve-foot wide panel, three four-foot wide panels may be placed side by side. In some examples, a first twelve-foot wide panel is assembled by placing three four-foot wide panels side by side to form a first layer. A second layer of a twelve-foot wide panel may include two two-foot wide panels and two four-foot wide panels. For example, a first two-foot wide panel is placed side by side to a first four-foot wide panel which is placed side by side a second four-foot wide panel which is placed side by side a second two-foot wide panel. This arrangement alternating between the first layer and second layer is repeated depending upon the desired thickness of the final panel assembly. The final panel assembly can then be connected by an end joint, such as a scarf joint by use of a radio frequency (RF) press.

FIG. 6 illustrates an end view of a finished panel assembly 600 comprising six alternating panel layouts. Each layer of the multi-layer panel assembly 600 may alternate which side the two foot piece is located on, such as panel layout 500 or panel layout 550. For example, a first layer of the assembly 600 may comprise panel layout 500, including first sheet 510, and a second layer of the assembly 600 may comprise panel layout 550, including third sheet 580. First panel 510 may be approximately half the width of third panel 580 located on the adjacent layer.

Panel edge 525 may be located at the approximate midpoint of third sheet 580 of the adjacent layer of panel layout 550. Similarly, panel edge 575 associated with one or panels of panel layout 550 may be located at an approximate mid-point of sheet 530 of the adjacent layer of panel layout 500. Other internal panel edges, such as panel edge 595 may also be located at the approximate mid-points of panels located in adjacent layers of assembly 600, such as sheet 520 of the first layer and sheet 590 of a third layer. In this manner, each internal panel edge, or joint, between panels may be spanned by one or more panels of the adjacent layers of assembly 600. Alternately placing a series of panel layouts 500, 550 may be repeated until the desired panel assembly thickness has been reached.

In some examples, a large format wood based panel may be constructed of veneer as the primary feed stock, regardless of orientation of wood fiber. One of the layers may consist of a plurality of one and one-eighth inch thick veneer plies arranged in in a panel configuration in which each subsequent ply may be oriented in perpendicular to each other. This layer may be surrounded by one or more additional layers of veneer in which the predominant grain direction of the veneer plies may all be oriented in a substantially parallel direction. The ratio of long-grain to cross grain may be dependent upon the longitudinal and lateral structural loads of the particular application. Similarly, the structural load required for a particular application may be used to determine the number of perpendicular oriented veneer layers in relation to the parallel veneer layers. The process of combining one or more perpendicular oriented layers with one or more parallel oriented layers may be repeated until a desired panel thickness is achieved for any one example panel assembly. In some example panel assemblies, a thicker plywood panel may be laid up first, and then fewer cold press layers may be added to create a larger format.

In another example layup, a one and one-eighth inch parallel veneer panel (panel constructed of veneers in the same orientation longitudinally) may be used for the top and bottom sheet and a $31/32$ inch panel may be used for the center sheet. In other examples, ripped and edge-glued panels (i.e., with vertical grain) may be used instead of plywood. Additionally, the panel may comprise LVL and/or laminated sheets.

In the example panel assembly 600 illustrated in FIG. 6, all of the individual sheets (plywood, LVL, veneer, etc.), may generally be oriented in a longitudinal direction of the panel assembly 600 for all of the panel layouts. For example, assuming the sheets are either two by eight feet or four by eight feet, the eight feet sheet lengths may all be aligned with the length of the panel assembly 600. In other examples, the lengths of the individual sheets may be alternately aligned with the length and width of the panel.

Additionally, the structural joints of adjacent rows, billets, and/or columns of sheets may be staggered so that any two joints for a given layout may be intentionally misaligned. Still further, the joints may be intentionally misaligned as between some or all of the upper and lower layouts that are layered together to form the panel assembly.

One or more of the layers of panel assembly 600 may comprise panels including the cross-grain configuration of plywood assembly 150 illustrated in FIG. 1. Additionally, one or more of the layers may comprise panels configured similarly as plywood assembly 250 (FIG. 2) and/or plywood assembly 350 (FIG. 3).

In some examples, a panel assembly may be used as a floor or a roof of a building, where end-use of the panel assembly is assumed to be horizontal. The panel assembly may be constructed in a format different from panels that are used for a wall or vertical application. Veneer grain orientation may be configured to provide additional structural integrity if the wood grain aligns with the direction of span. A floor may be constructed with an LVL panel assembly or a Parallel Laminated Veneer Lumber (PLVL) panel assembly. An LVL panel assembly may be distinguished from a PLVL panel assembly because LVL may comprise veneer layers in which select-density veneers may all be provided in a long-grained or parallel orientation. In some examples, the panel assembly may contain a preponderance of long grain veneers in addition to one or more perpendicular veneer layers. Each layer of the panel assembly may be manufactured and/or otherwise associated with a particular density grade.

A four feet by eight feet PLVL panel with all long grain veneer, may be placed on the top panel, or compression board, as well as the bottom panel, the tension board, of an LVT layup. In some examples, a standard plywood panel, such as a cross directional grain panel, may be used as the center panel of three-layer LVT panel to provide additional lateral stability. Improvements in potential load rating and span ability may be achieved when using parallel oriented veneer for part of the panel construction, in particular the top and bottom chords of the panel. Orienting the panels in the same direction may allow for more of the long grain veneers to be in the direction of the span.

Much as a plywood panel may be configured to provide additional shear strength due to the cross directional layup of veneer within each panel assembly, the inclusion of plywood may also provide additional benefit to a wall panel assembly. the panel assembly for wall applications may include a standard cross-directional plywood layup, made up of one and one-eighth inch, nine-ply plywood. The number of panel plies may be varied depending upon the structural requirements of the application, but in some examples may be combined to form a total thickness of approximately three inches (e.g., 3.125 inches), or thicker, depending on the application. Similarly, the thickness of the billet may be varied depending upon the structural application and mechanical limitations of the opening of the press. In a wall panel application, more stress tends be placed on the panel assembly from the vertical, or edge of panel, and upon the entire panel due to racking or multi-directional forces, such that the span and direction of grain is less important.

Figure 7:
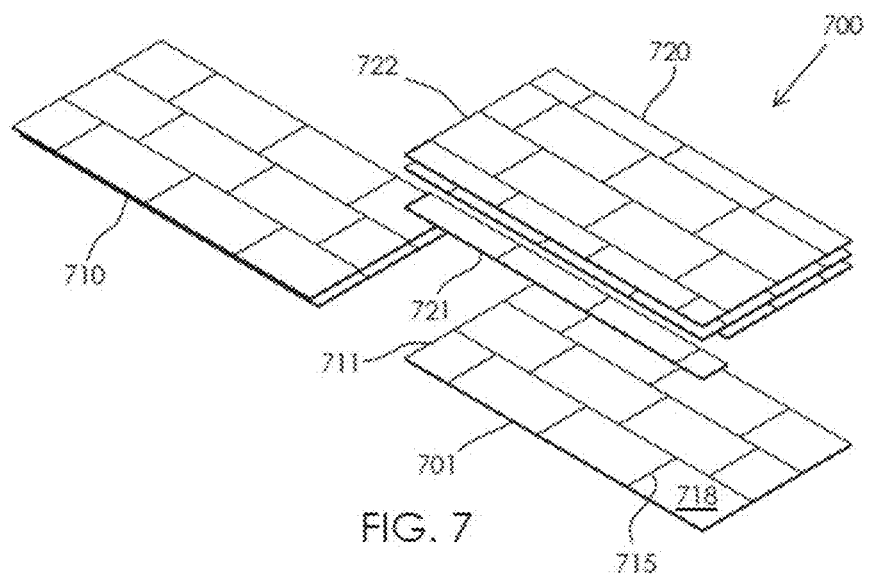
FIG. 7 illustrates an example panel assembly comprising a first layer.

FIG. 7 illustrates an example panel assembly 700 comprising panels alternately selected from a first panel layout 710 and a second panel layout 720. First panel layout 710 may comprise three rows or billets of whole (e.g., four foot wide) sheets, whereas second panel layout 720 may comprise two whole and two partial, or half (e.g., two foot wide) sheets. By way of illustrative example, each stack of panel layouts 710, 720 may comprise three layers of sheets, such that the finished panel assembly 700 may comprise six total layers of sheets laminated to each other.

Two stacks of longitudinally aligned panel layouts may be alternately placed on top of each other to construct a panel with misaligned joints. Offsetting the structural joint in a larger billet provides increased structural strength in the overall panel, by removing potential weak points at the joints.

To begin the structural joint construction, the first panel goes through a tenoner, however at this stage there is nothing for the first panel to be joined to. The first inch or two of the sheet may be cut off in order to square the sheet before proceeding to a continuous billet. On every sheet, approximately one inch may be routed off each end, so the joint is offset by one inch (once joined) on every panel that receives a tenon joint. In other examples, an 8:1 ratio of panel thickness may create an automatic offset from each subsequent panel, without routing off one or more ends. When constructed into a full mat, the structural joint may be offset from the sheets surrounding it.

A first layer 701 of sheets selected from first panel layout 710 may comprise three rows of sheets, including first panel row 711. First panel row 711 may comprise a full-sized sheet 718 associated with a joint 715. A first panel row 721 selected from second panel layout 720 is illustrated as being in the process of being placed on top of the first layer 701. First panel row 721 may comprise a plurality of half-sized or partial sheets. Additionally, second panel layout 720 may include a second panel row 722 comprising full-sized sheets.

Weak points in the panel may tend to exist at the edge abutted joints between differently sized (e.g., four feet and two feet) ripped panels. The panel may be strengthened by staggering the layup in a brick fashion. Any weakness in the structural joint of a panel may be strengthened by the offset panel on top or below it.

Figure 8:
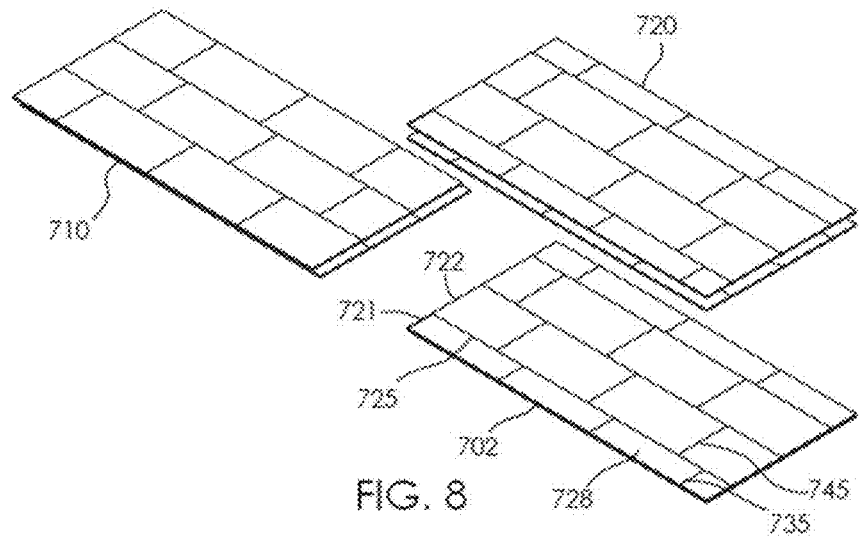
FIG. 8 illustrates a second layer of the example panel assembly of FIG. 7.

FIG. 8 illustrates a second layer 702 of the example panel assembly 700, comprising first panel row 721 and second panel row 722. The second layer 702 of sheets may be selected from the second panel layout 720. First panel row 721 may comprise a plurality of partial sheets layered on top of the first panel row 711 of the first layer 701 (FIG. 7), such that a panel edge 725 of first panel row 721 of second layer 702 aligns with a longitudinal centerline of the first panel row 711 of the first layer 701 and/or bisects full-sized sheet 718.

First panel row 721 may comprise a half-sized sheet 728 associated with a joint 735. Joint 735 may comprise a joint between sheet 728 and a partial sheet located in a corner of the second layer 702. Joint 735 of the second layer 702 may be staggered or offset with joint 715 of the first layer 701, such that joint 715 lies directly under sheet 728 of the second layer 702, and joint 735 lies directly over sheet 718 of the first layer 701. Additionally, second panel row 722 may comprise a second joint 745 which is both longitudinal and laterally offset from joint 735 and joint 715.

Figure 9:
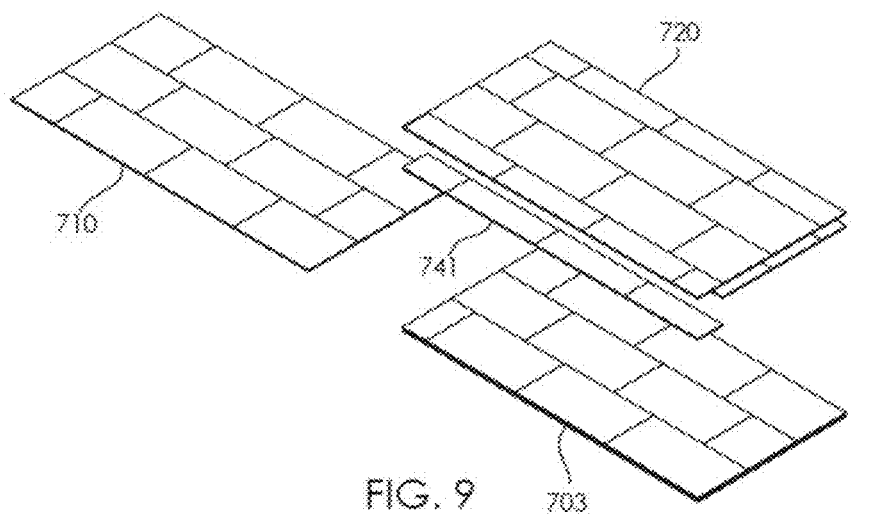
FIG. 9 illustrates a third layer of the example panel assembly of FIG. 7.

FIG. 9 illustrates a third layer 703 of the example panel assembly 700 selected from the first panel layout 710. The third layer 703 of sheets may comprise three rows of full-sized (e.g., full-width) sheets. A first panel row 741 selected from the second panel layout 720 is illustrated as being in the process of being placed on top of the third layer 703 in anticipation of adding a forth layer.

Figure 10:
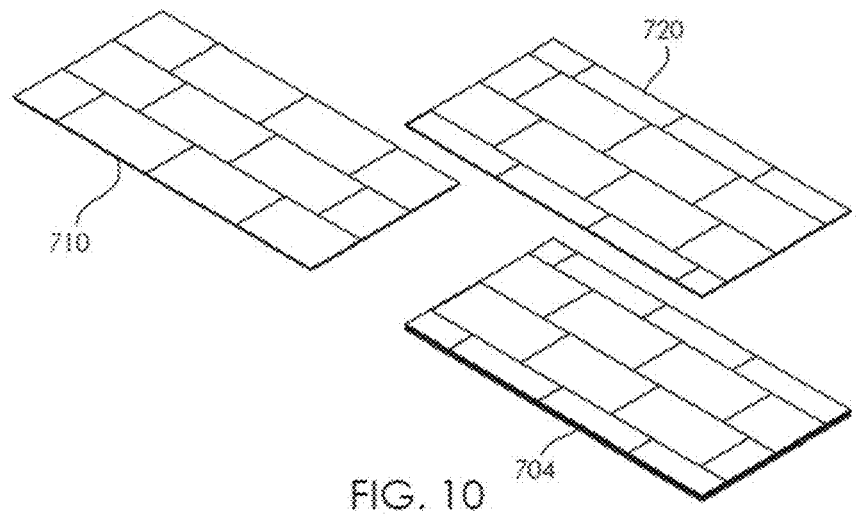
FIG. 10 illustrates a fourth layer of the example panel assembly of FIG. 7.

FIG. 10 illustrates a fourth layer 704 of the example panel assembly 700 selected from the second panel layout 720. The fourth layer 704 of sheets may comprise two rows of whole-width sheets and two rows of partial, or half-width sheets.

Figure 11:
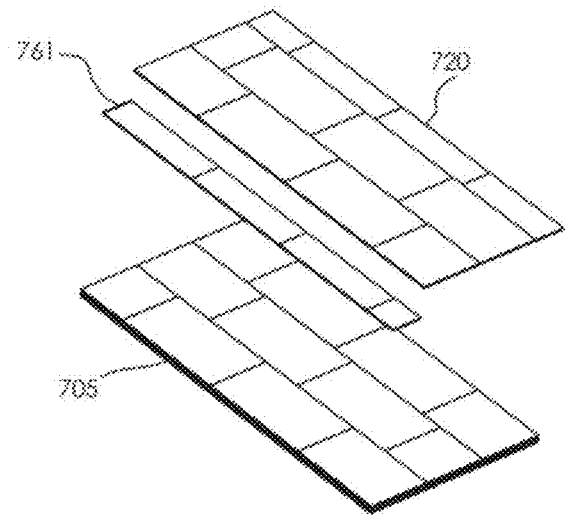
FIG. 11 illustrates a fifth layer of the example panel assembly of FIG. 7.

FIG. 11 illustrates a fifth layer 705 of the example panel assembly 700 selected from the first panel layout 710 (FIG. 10). The fifth layer 705 of sheets may comprise three rows of full-sized (e.g., full-width) sheets. A first panel row 761 selected from the second panel layout 720 is illustrated as being in the process of being placed on top of the fifth layer 705 in anticipation of adding a sixth layer.

Figure 12:
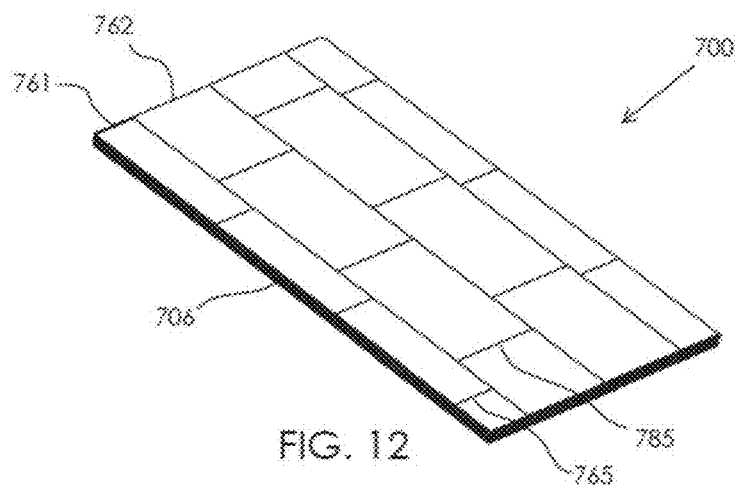
FIG. 12 illustrates a sixth layer of the example panel assembly of FIG. 7.

FIG. 12 illustrates a sixth, and in some examples final, layer 706 of the panel assembly 700 which was selected from the second panel layout 720 (FIG. 11), including panel row 761. Sixth layer 706 of sheets may comprise two rows of whole-width sheets and two rows of partial, or half-width sheets, including first panel row 761 and a second panel row 762. The sixth row 706 may comprise a plurality of joints which are all laterally and/or longitudinally offset from each other. For example, a first joint 765 may be both laterally and longitudinally offset from a second joint.

In some examples panel assemblies, any one joint in the panel assembly 700 may be longitudinally offset from all other joints of the panel assembly. In other example panel assemblies, any one joint in a first row of one of the layers, such as joint 765, may be longitudinally offset from all other joints in the corresponding first rows of adjacent layers of the panel assembly, such as the fifth layer 705. In still other example panel assemblies, any one joint such as joint 765 may be longitudinally offset from all other joints in the corresponding first rows of all of the layers, such as the first through fifth layers.

Whereas some of the example panel assemblies are described as including one or more half-sheets, in which case the interior edges for any one row of panels may be understood to vary in lateral spacing by half the width of the full sheet, in other examples, partial sheets including less or more than half the width of a full sheet may be used such that the edges corresponding to the same panel rows do not align with edges of panels in adjacent sheets, or in some examples do not align with edges of panels in all of the sheets of the panel assembly. Offsetting some or substantially all of the joints and/or interior panel edges in a larger billet may help reduce or eliminate any potential structural weakness in the overall panel assembly 700.

Figure 13:
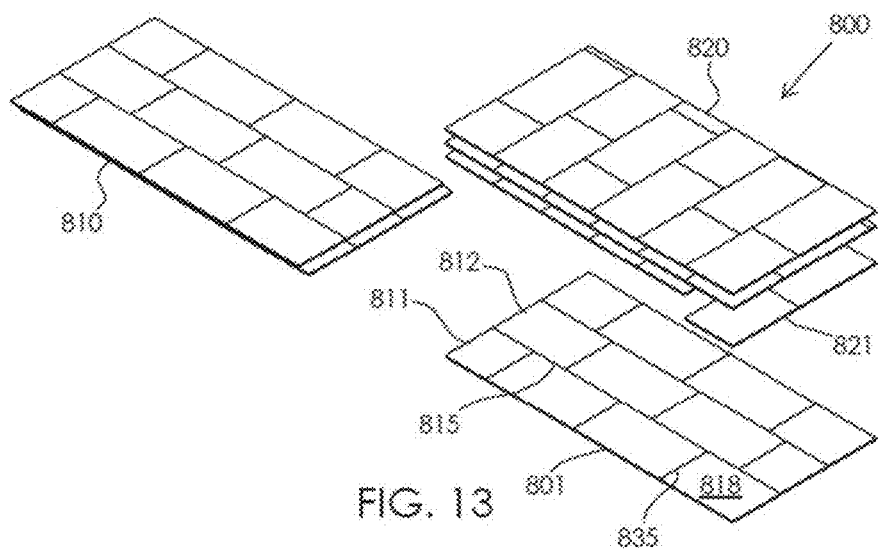
FIG. 13 illustrates another example panel assembly comprising a first layer.

FIG. 13 illustrates another example panel assembly 800 comprising panels alternately selected from a first panel layout 810 and a second panel layout 820. First panel layout 810 may comprise three rows, or billets, of sheets arranged in a longitudinal direction with respect to the panel assembly 800, whereas second panel layout 820 may comprise six rows of sheets arranged in a transverse or lateral direction with respect to the panel assembly 800. By way of illustrative example, each stack of panel layouts 810, 820 may comprise three layers of sheets, such that the finished panel assembly 800 may comprise six total layers of sheets laminated to each other.

In some examples, two stacks of longitudinally and laterally aligned panel layouts may be alternately placed on top of each other to construct a panel assembly 800 with misaligned joints. For examples, a first layer 801 of sheets selected from first panel layout 810 may comprise three rows of sheets, including a first panel row 811 and a second panel row 812. First panel row 811 may comprise a sheet 818 associated with a joint 835. Additionally, a panel edge 815 may be located where first panel row 811 abuts against and/or is joined together with second panel row 812. A transverse panel row 821 selected from second panel layout 820 is illustrated as being in the process of being placed on top of the first layer 801.

Figure 14:
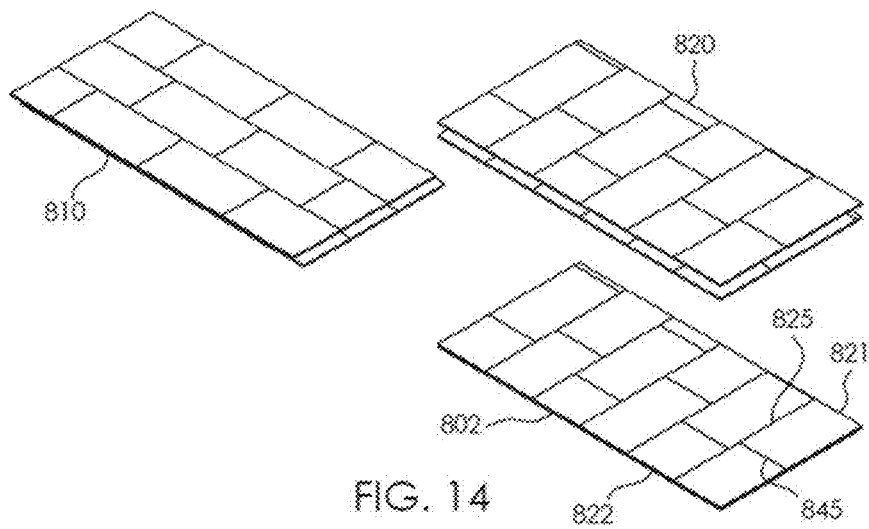
FIG. 14 illustrates a second layer of the example panel assembly of FIG. 13.

FIG. 14 illustrates a second layer 802 of the example panel assembly 800, comprising transverse panel row 821 and a second transverse panel row 822. The second layer 802 of sheets may be selected from the second panel layout 820. Transverse panel row 821 may comprise a plurality of sheets and/or partial sheets layered on top of the first layer 801 (FIG. 13) in a perpendicular orientation to the first panel row 811, such that a panel edge 825 of transverse panel row 821 is oriented perpendicular to the panel edge 815 of the first panel row 811.

Transverse panel row 821 is illustrated as including a joint 845 locate where a full sheet abuts up against and/or is joined to a partial sheet. Joint 845 of transverse panel row 821 is also oriented perpendicular to the joint 835 of the first panel row 811 (FIG. 13). In some examples, joint 845 may be rotationally offset from joint 835. In some examples, a joint and/or panel edge associated with the second layer 802 may intersect a joint and/or panel edge associated with the first layer 801.

Figure 15:
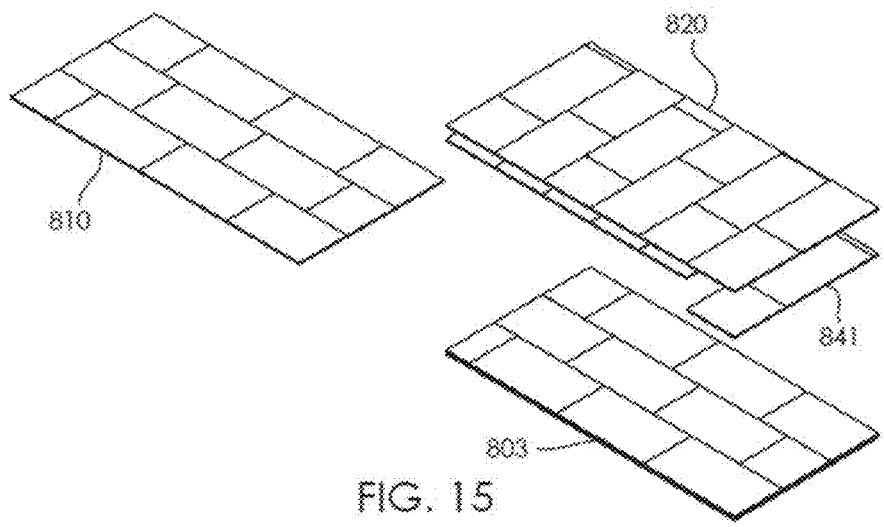
FIG. 15 illustrates a third layer of the example panel assembly of FIG. 13.

FIG. 15 illustrates a third layer 803 of the example panel assembly 800 selected from the first panel layout 810. The third layer 803 of sheets may comprise three rows of full-sized and/or partial sheets. A transverse panel row 841 selected from the second panel layout 820 is illustrated as being in the process of being placed on top of the third layer 803 in anticipation of adding a forth layer.

Figure 16:
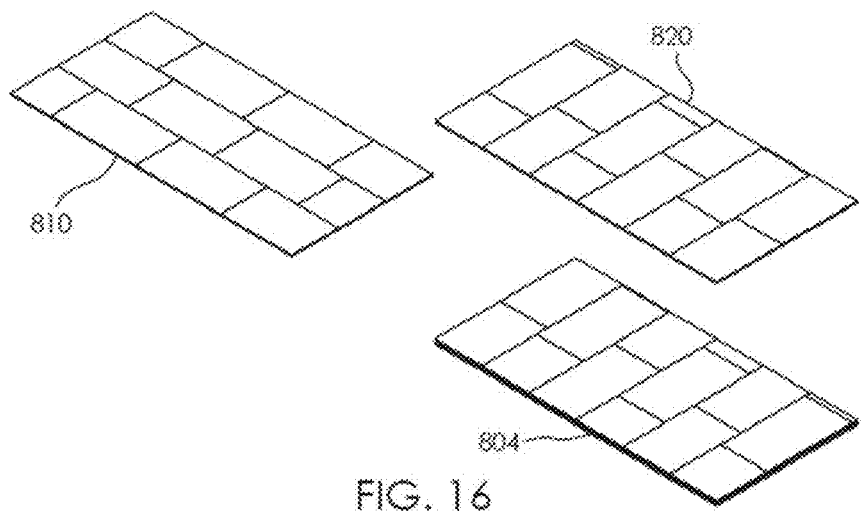
FIG. 16 illustrates a fourth layer of the example panel assembly of FIG. 13.

FIG. 16 illustrates a fourth layer 804 of the example panel assembly 800 selected from the second panel layout 820. The fourth layer 804 of sheets may comprise a number of transverse panel rows including a plurality of sheets and/or partial sheets layered on top of the third layer 803 (FIG. 15) in a perpendicular orientation.

Figure 17:
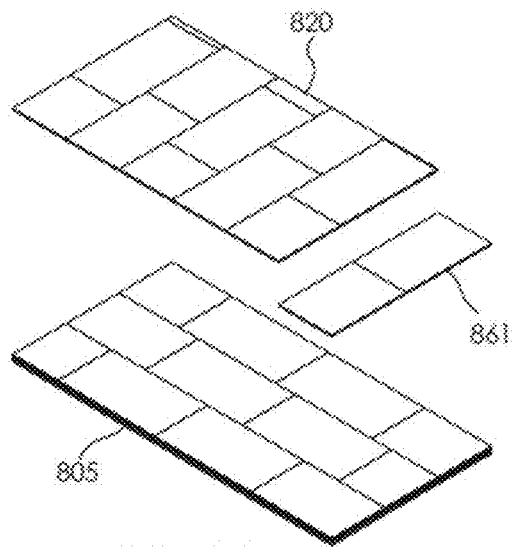
FIG. 17 illustrates a fifth layer of the example panel assembly of FIG. 13.

FIG. 17 illustrates a fifth layer 805 of the example panel assembly 800 selected from the first panel layout 810 (FIG. 16). The fifth layer 805 of sheets may comprise three rows of full-sized and/or partial sheets. A transverse panel row 861 selected from the second panel layout 820 is illustrated as being in the process of being placed on top of the fifth layer 805 in anticipation of adding a sixth layer.

Figure 18:
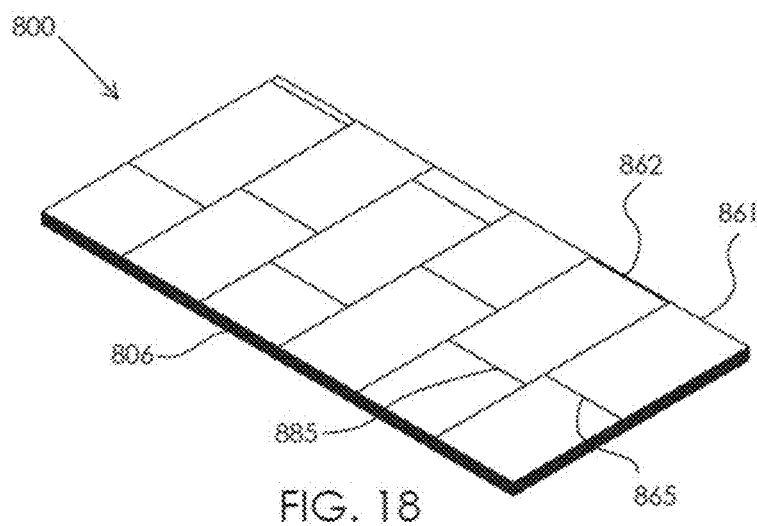
FIG. 18 illustrates a sixth layer of the example panel assembly of FIG. 13

FIG. 18 illustrates a sixth, and in some examples final, layer 806 of the panel assembly 800 which was selected from the second panel layout 820 (FIG. 17), including transverse panel row 861. The sixth layer 806 of sheets ma may comprise a number of transverse panel rows, including transverse panel row 861 and a second transverse panel row 862, layered on top of the fifth layer 805 in a perpendicular orientation. The sixth row 806 may comprise a plurality of joints which are all laterally and/or longitudinally offset from each other. For example, a first joint 865 may be both laterally and longitudinally offset from a second joint 885.

FIG. 19 illustrates an isometric view of an example row of sheets 2010, or billet, arranged in a longitudinal orientation. In some examples, row of sheets 2010 may be configured similarly as one or more rows of first panel layout 810 (FIG. 13). Row of sheets 2010 may comprise a plurality of whole and/or partial-length sheets. In some examples, each whole sheet may measure four feet wide, eight feet long, and one and one-eighth inches thick. Row of sheets 2010 may comprise a width 2050, a length 2040, and a thickness 2030.

In some examples, the width 2050 and thickness 2030 of the row of sheets 2010 may be the same as for an individual whole sheet, e.g., four feet by one and one-inches thick. Additionally, length 2040 of the row of sheets 2010 may be equal to the combined length of approximately three whole sheets, e.g., twenty-four feet. Other lengths and/or widths of the row of sheets 2010 may be obtained by including whole sheets having smaller or larger dimensions, by joining together more or fewer sheets, by using partial-length and/or partial-width sheets, or any combination thereof.

The row of sheets 2010 may comprise at least one whole-length sheet, such as sheet 2011 and/or sheet 2012, and at least one partial-length sheet 2013. In some examples, the row of sheets 2010 may comprise two whole-length sheets and two partial-length sheets, in which the combined length of the two partial-length sheets may be approximately equal to one whole-length sheet.

Any two sheets, such as sheet 2011 and sheet 2012, may be joined together by a joint 2015 as shown in the enlarged view, FIG. 19B. In some examples, the joint 2015 may comprise a scarf joint, as illustrated in FIG. 19A, or some other type of structural joint. By way of further example, the joint 2015 may also comprise a finger-joint, in which portions of sheet 2011 are interleaved with offset portions of sheet 2012 to form an interlocked joint.

FIG. 20A illustrates an isometric view of an example transverse row of sheets 2020, or transverse billet, arranged in a transverse, or lateral orientation. In some examples, transverse row of sheets 2020 may be configured similarly as one or more rows of second panel layout 820 (FIG. 13). Transverse row of sheets 2020 may comprise a plurality of whole and/or partial-length sheets. In some examples, each whole sheet may measure four feet wide, eight feet long, and one and one-eighth inches thick. Transverse row of sheets 2020 may comprise a width 2150, a length 2140, and a thickness 2130.

In some examples, the width 2150 and thickness 2130 of the transverse row of sheets 2120 may be the same as for an individual whole sheet, e.g., four feet wide by one and one-inches thick. Additionally, length 2140 of the transverse row of sheets 2020 may be equal to the combined length of approximately one and one-half whole sheets, e.g., twelve feet. Other lengths and/or widths of the transverse row of sheets 2020 may be obtained by including whole sheets having smaller or larger dimensions, by joining together more or fewer sheets, by using partial-length and/or partial-width sheets, or any combination thereof.

The transverse row of sheets 2020 may comprise at least one whole-length sheet, such as sheet 2022, and at least one partial-length sheet 2021. In some examples, the transverse row of sheets 2020 may comprise one whole-length sheet and two partial-length sheets, in which the combined length of the two partial-length sheets may be approximately equal to one half of a whole-length sheet.

Any two sheets, such as sheet 2022 and partial-length sheet 2021, may be joined together by a joint 2025 as shown in the enlarged view, FIG. 20B. In some examples, the joint 2025 may comprise a scarf joint or a finger-joint, similar to that described for joint 2015 (FIG. 19A).

FIG. 21A illustrates an isometric view of an example panel assembly 2000 comprising the rows of sheets of FIGS. 19A and 20A configured in a cross-panel construction. Panel assembly 2000 may comprise three layers of sheets configured similarly as row 2010 (FIG. 19A), alternately layered together with three layers of sheets configured similarly as transverse row 2020 (FIG. 20A), for a total of six layers.

The panel assembly 2000 may comprise a width 2250, a length 2240, and a thickness 2230. In some examples, the width 2250 and length 2240 of the panel assembly 2000 may be the same for each layer, e.g., four feet wide by twenty-four feet long. Additionally, the thickness 2230 of the panel assembly 2000 may be equal to the combined thickness of approximately six layers of sheets, e.g., six and three-fourths inches. Other lengths, widths and/or thicknesses of the row of panel assemblies may be obtained by including whole sheets having smaller or larger dimensions, by joining together more or fewer sheets, by using partial-length and/or partial-width sheets, by using more or fewer layers of sheets, or any combination thereof A top layer of panel assembly 2000 is illustrated as including a first billet 2210 and a second billet 2220 oriented in a transverse position with respect to the length 2240. FIG. 21B illustrates an enlarged view of a joint 2225 between first billet 2210 and second billet 2220 in relationship to other joints in the underlying layers of the panel assembly 2000. In some examples, any one joint between transverse billets, such as joint 2225, may be laterally, longitudinally, and/or rotationally offset from the joints associated with adjacent layers of the panel assembly 2000.

Additionally, FIG. 21C illustrates an enlarged view of a joint 2235 between longitudinally oriented billets in one layer in relationship to other joints in the additional layers of the panel assembly 2000. In some examples, any one joint between transverse billets, such as joint 2235, may be laterally, longitudinally, and/or rotationally offset from the joints associated with adjacent layers of the panel assembly 2000.

FIG. 22 illustrates a top view of the example panel assembly 2000 of FIG. 21A, indicating a plurality of longitudinal joints 2265, e.g., with respect the length 2240 of the panel assembly 2000, and transverse joints 2275, e.g., with respect the length 2240 of the panel assembly 2000. The longitudinal joints 2265 and transverse joints 2275 may be understood as being associated with the various layers of the panel assembly 2000, and are shown in dashed lines to indicate the relative offset positions with respect to each other, as between the layers.

Figures 23A, 23B:
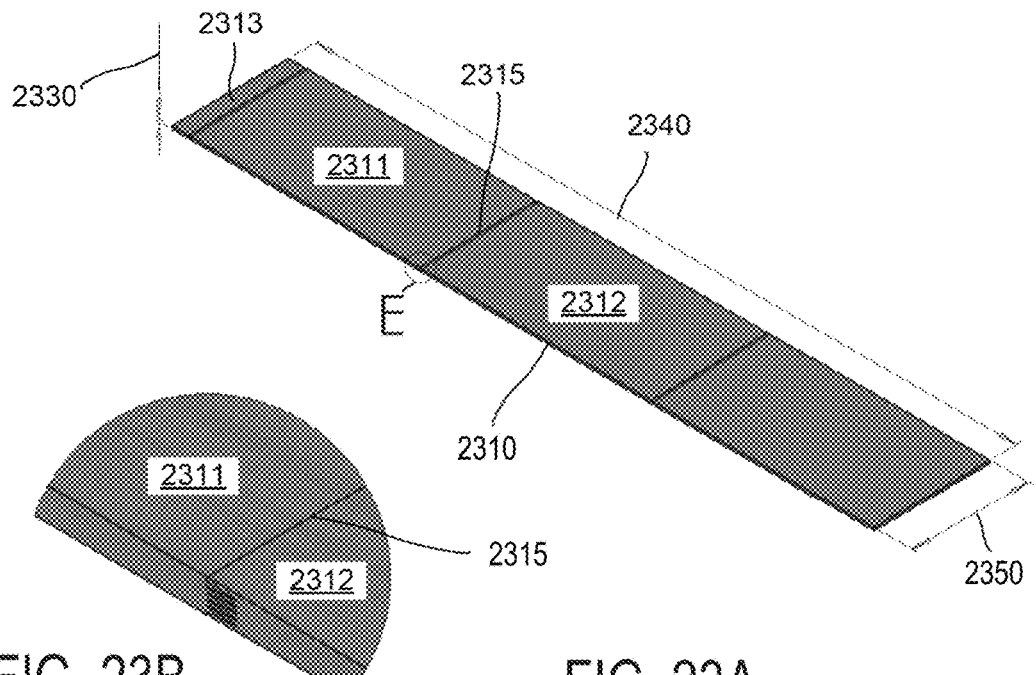
FIG. 23A illustrates an isometric view of an example first row, or billet, of full-width sheets.
FIG. 23B illustrates an exploded view of Point E on FIG. 23A.

FIG. 23A illustrates an isometric view of an example first row 2310, or billet, of full-width sheets. In some examples, row of sheets 2310 may be configured similarly as one or more rows or billets of first panel layout 710 (FIG. 9), or row 2010 (FIG. 9). Row of sheets 2310 may comprise a plurality of whole and/or partial-length sheets, and may comprise a width 2350, a length 2340, and a thickness 2330.

In some examples, the width 2350 and thickness 2330 of the row of sheets 2310 may be the same as for an individual whole sheet, and length 2340 of the row of sheets 2310 may be equal to the combined length of approximately three whole sheets. The row of sheets 2310 may comprise at least one whole-length sheet, such as sheet 2311 and/or sheet 2312, and at least one partial-length sheet 2313. In some examples, the row of sheets 2310 may comprise two whole-length sheets and two partial-length sheets, in which the combined length of the two partial-length sheets may be approximately equal to one whole-length sheet.

Any two sheets, such as sheet 2311 and sheet 2312, may be joined together by a joint 2315 as shown in the enlarged view, FIG. 23B. In some examples, the joint 2315 may comprise a finger-joint. In other examples, joint 2315 may comprise a scarf joint, similar to that described for joint 2015 (FIG. 19A).

Figures 24A, 24B:
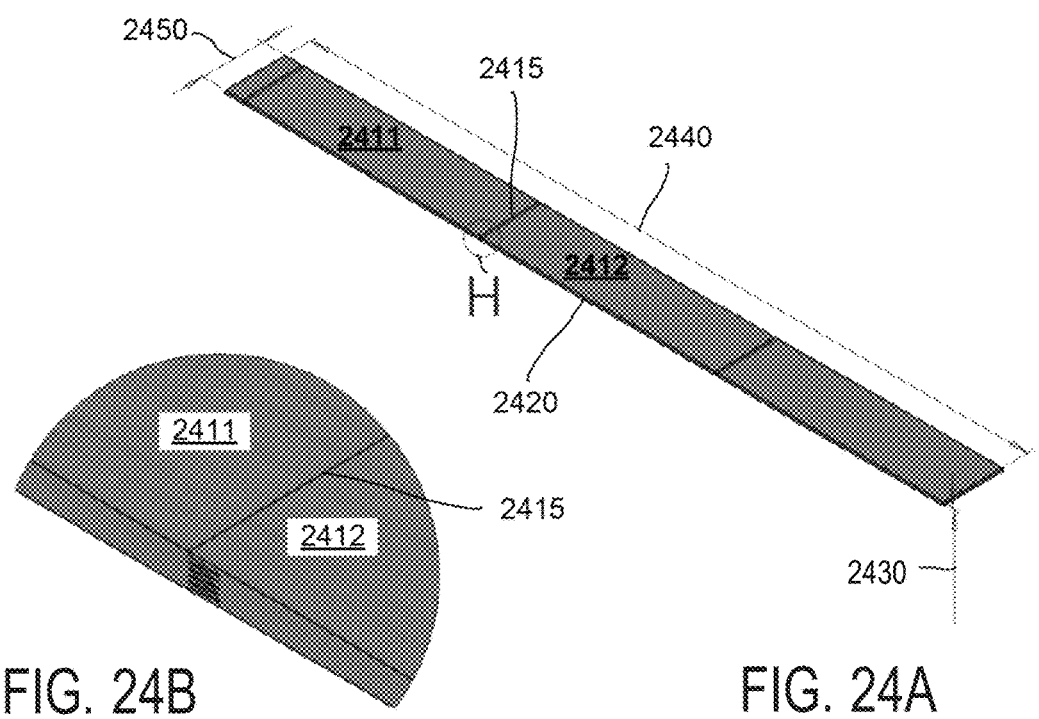
FIG. 24A illustrates an isometric view of an example second row, or billet, of partial-width sheets.
FIG. 24B illustrates an exploded view of Point H on FIG. 24A.

FIG. 24A illustrates an isometric view of an example second row 2420, or billet, of partial-width sheets. In some examples, the second row of sheets 2420 may be configured similarly as one or more rows of second panel layout 720 (FIG. 9). Second row of sheets 2420 may comprise a plurality of whole-length and/or partial-length sheets. In some examples, each whole-length sheet may measure two feet wide, eight feet long, and one and one-eighth inches thick. The second row of sheets 2420 may comprise a width 2450, a length 2440, and a thickness 2430.

In some examples, the thickness 2430 of the second row of sheets 2420 may be the same as for an individual whole sheet, e.g., one and one-inches thick. Additionally, length 2440 of the second row of sheets 2420 may be equal to the combined length of approximately three whole-length sheets, e.g., twenty-four feet. In some examples, the width 2450 of second row 2420 may be approximately equal to half the width of a full-width sheet, e.g., two feet. Other lengths and/or widths of the second row of sheets 2420 may be obtained by including whole-length sheets having smaller or larger dimensions, by joining together more or fewer sheets, by using partial-length sheets, or any combination thereof.

The second row of sheets 2420 may comprise at least one whole-length sheet, such as sheet 2411 or sheet 2412. In some examples, the second row of sheets 2420 may comprise two whole-length sheets and two partial-length sheets, in which the combined length of the two partial-length sheets may be approximately equal to three whole-length sheets. Any two sheets, such as 2411 and sheet 2412, may be joined together by a joint 2415 as shown in the enlarged view, FIG. 24B. In some examples, the joint 2415 may comprise a finger-joint, a scarf joint, or some other type of structural joint.

Figures 25A, 25B, 25C, 26:
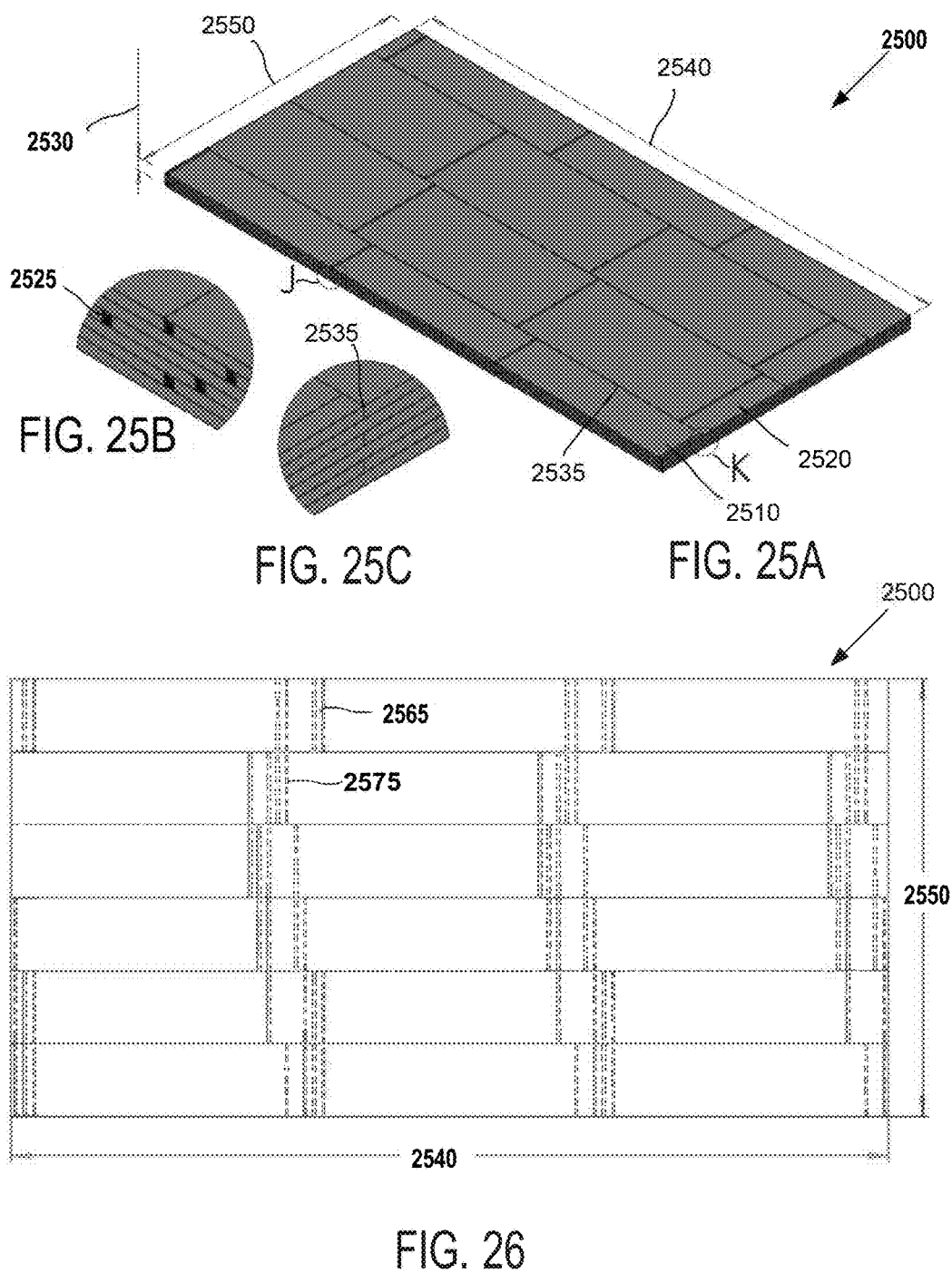
FIG. 25A illustrates an isometric view of an example panel assembly comprising the rows of sheets of FIGS. 23A and 24A configured in a parallel-panel construction.
FIG. 25B illustrates an exploded view of Point J on FIG. 25A.
FIG. 25C illustrates an exploded view of Point K on FIG. 25A.
FIG. 26 illustrates a top view of the example panel assembly of FIG. 25A.

FIG. 25A illustrates an isometric view of an example panel assembly 2500 comprising the rows of sheets of FIGS. 23A and 24A configured in a parallel-panel construction. Panel assembly 2500 may comprise three layers of sheets configured similarly as first row 2310 (FIG. 23A), alternately layered together with three layers of sheets configured similarly as second row 2420 (FIG. 24A), for a total of six layers.

The panel assembly 2500 may comprise a width 2550, a length 2540, and a thickness 2530. In some examples, the width 2550 and length 2540 of the panel assembly 2500 may be the same for each layer, e.g., four feet wide by twenty-four feet long. Additionally, the thickness 2530 of the panel assembly 2500 may be equal to the combined thickness of approximately six layers of sheets, e.g., six and three-fourths inches. Other lengths, widths and/or thicknesses of the row of panel assemblies may be obtained by including whole sheets having smaller or larger dimensions, by joining together more or fewer sheets, by using partial-length and/or partial-width sheets, by using more or fewer layers of sheets, or any combination thereof A top layer of panel assembly 2500 is illustrated as including a first billet 2510 and a second billet 2520 oriented longitudinally with respect to the length 2540. FIG. 25C illustrates an enlarged view of a joint 2535 between first billet 2510 and second billet 2520 in relationship to other joints in the underlying layers of the panel assembly 2500. In some examples, any one joint between billets, such as joint 2535, may be laterally, longitudinally, and/or rotationally offset from the joints associated with adjacent layers of the panel assembly 2500.

Additionally, FIG. 25B illustrates an enlarged view of joints 2525 formed between adjacent sheets of the billets to demonstrate the relationship between joints in the various layers of the panel assembly 2500. In some examples, any one joint between sheets in a billet, such as joint 2235, may be laterally and/or longitudinally offset from the joints between adjacent sheets associated with billets located in other layers of the panel assembly 2500.

FIG. 26 illustrates a top view of the example panel assembly 2500 of FIG. 25A, indicating a plurality of joints 2565 associated with partial-width billets, such as second row of sheets 2420 (FIG. 24A), and a plurality of joints 2575 associated with full-width billets, such as first row of sheets 2310 (FIG. 23A). The joints 2565, 2575 may be understood as being associated with the various layers of the panel assembly 2500, and are shown in dashed lines to indicate the relative offset positions with respect to each other, as between the layers.

National fire code regulations on engineered floor joists (e.g., top and bottom LVL or MSR graded lumber flanges with OSB web) may stipulate that any OSB web must be in an enclosed dry wall ceiling. Additionally, fire code regulations may require that the engineered wood products incorporate additional fire suppression systems (sprinklers, chemical fire suppressant on the OSB, or encased in mineral wool) in order to mitigate the likelihood that the OSB web may burn and cause the joist to lose structural integrity. All of these requirements may be associated with additional cost for construction and use of manufactured or engineered wood joists.

Engineered wood products comprising plywood and/or LVL, may comprise a catalyzed resin which may be permanently bonded to each layer and which does not degrade due to high temperatures. Based in part on the relatively thinner layers as compared to CLT products, the engineered wood panels may have significantly more layers of catalyzed resin that would need to be burned through before the structural integrity of the assembly was compromised, as compared to CLT products. Additionally, plywood of LVL-based panels do not need to use lamellas, which might otherwise separate from a CLT product.

FIG. 27A illustrates an isometric view of an example joist assembly 2700 comprising two layers of billets, including a first billet 2710 and a second billet 2720, as indicated in the enlarged view, FIG. 27B. Joist assembly 2700 may be configured as an I-joist comprising a length 2740, a width 2750, and a thickness 2730.

One or both billets 2710, 2720 may comprise a plurality of sheets and/or partial-length sheets. For example, billet 2710 may comprise a first sheet 2711 and a second sheet 2712 connected together at a joint 2715, as indicated in the enlarged view, FIG. 27C. Joint 2715 associated with billet 2710 may be located adjacent a sheet of billet 2720. In some examples, joint 2715 may be located at a longitudinal mid-point of the adjacent sheet of billet 2720.

In some examples, two separate billets may be cold-pressed together with offset structural joints, such that the joints are strengthened by the adjacent solid panels which will mitigate any weakness on one of the joints. For example, two three-fourth inch billets may be cold-pressed together, and the resultant panel may then be ripped into appropriate product widths, such as eleven and seven-eighths inches, to create finished I-joists that may measure one and one-half thick by eleven and seven-eighths inches wide, by any desired length.

In some examples, joist assembly 2700 may measure approximately one-foot wide, twelve feet long, and one and one-half inches thick. Other lengths, widths, and or thicknesses may be obtained by including whole-length sheets having smaller or larger dimensions, by joining together more or fewer sheets, by using partial-length sheets, or any combination thereof.

Glue or resin used to adhere the billets 2710, 2720 together may provide fire suppression characteristics. In some examples, one or both billets 2710, 2720 may comprise plywood sheets. Accordingly, joists may be constructed out of layered billets of plywood that have sufficient fire suppression characteristics that would obviate any requirement for additional fire suppression systems beyond what may be required for more conventional steel joists. However, a wood joist may be constructed at less cost and at a fraction of the weight of steel joists.

FIG. 28A illustrates an isometric view of an example rim-board assembly 2800 comprising two layers of billets, including a first billet 2810 and a second billet 2820, as indicated in the enlarged view, FIG. 28B. Rim board assembly 2800 may comprise a length 2840, a width 2850, and a thickness 2830.

Rim board assembly 2800 may be constructed in a similar manner as the example joist 2700 of FIG. 27A, depending on desired thickness, width and length. In some examples, rim board assembly 2800 may measure approximately one foot and seven-eighths inches wide, twelve feet long, and one and one-eighth inches thick. Other lengths, widths, and or thicknesses may be obtained by including whole-length sheets having smaller or larger dimensions, by joining together more or fewer sheets, by using partial-length sheets, or any combination thereof.

In some examples, rim boards may be manufactured similarly as described above for joist 2700, by ripping panel assemblies formed from two or more layers of billets into appropriate product widths. Additionally, the rim board assembly 2800 may comprise sheets joined together with offset structural joints. For example, a joint 2825 associated with second billet 2820 may be located adjacent a sheet of first billet 2810, as shown in the enlarged view, FIG. 28A. Similarly, a joint 2815 located between sheets 2811 and 2812 of first billet 2810 may be located adjacent a sheet of second billet 2820, as shown in the enlarged view, FIG. 28B. In some examples, a rim board assembly is formed by alternating production with a finger-joint and on edge.

Materials used to create rim boards may be selected based, at least in part, on their ability to be formed at length. OSB is an example material that may be used for rim boards. By joining five-eighth inch layers of plywood or other types of wood products, and offsetting the structural joints in two layers, an engineered rim board assembly may be constructed to any desired length.

Figure 29:
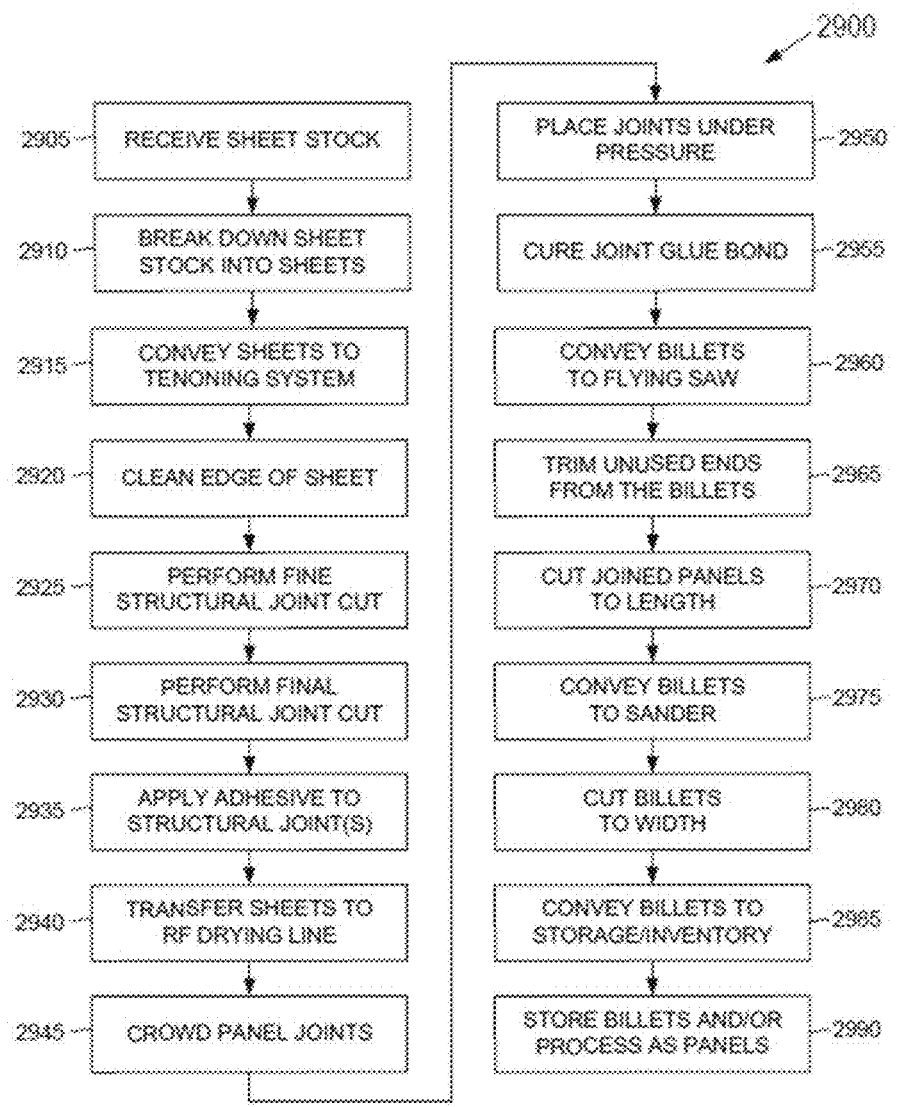
FIG. 29 illustrates an example process for manufacturing a laminated wood product comprising a structural joint.

FIG. 29 illustrates an example process 2900 for manufacturing a laminated wood product comprising a structural joint. At operation 2905, a veneer or plywood sheet stock may be received and placed on an infeed system, such as a vacuum feeder or a bottom feed device.

At operation 2910, the infeed system may be configured to break down the plywood sheet stock to individual sheets, or panels.

At operation 2915, the individual sheets may be fed through or otherwise conveyed to a tenoning system, such as a double end tenoner. The tenoning system may be configured to perform one or more operations of process 2900. For example, at operation 2920 a first profile head of the tenoning system may be configured to clean up one edge of the sheet and remove a rough portion of the joint.

At operation 2925, a second profile head of the tenoning system may be configured to perform a "fine" structural joint cut on the edge of the sheet.

At operation 2930, a third head of the tenoning system may be configured to perform a "final" structural joint cut on the edge of the sheet. In some examples, a male joint is created on one panel and a female joint may be created on a second sheet that is to be joined to the first sheet, such as in finger-joint construction. In other examples, one or more of the joints may comprise scarf joints or some other type of structural joints.

At operation 2935, glue may be applied to the structural joints following one or more of the tenoning operations 2920, 2925, and/or 2930.

At operation 2940, rather than immediately applying the glue upon exit from the tenoning system, the joined sheets may instead be transferred to a crowding and radio frequency (RF) drying line where glue or resin may be applied to the joints. The resin may comprise Polyurethane, Melamine, Resorcinol, other types of adhesive, or any combination thereof. In some examples, the method does not use an impregnated resin.

In some examples, the RF line may be configured to perform one or more operations of process 2900. For example, at operation 2945, the RF line may be configured to "crowd" the panel joints together during the RF process, until the glue has set. In some examples, at operation 2945, the RF line may be configured to "crowd" the panel joints together and optionally, preliminarily joined by fasteners, such as staples (e.g., polymeric (plastic) staples).

At operation 2950, the RF line may be configured to place the joints under pressure. At operation 2955, drying systems of the RF line may be configured to cure the joint glue bond. Following operation 2955, sanding of the continuously joined sheets, or billets, to produce a consistent surface and thickness occurs. Sanding is required to smooth the surface for better adhesion to a subsequent board which minimizes future glue use. Sanding also removes joint toe compression. In some examples of the disclosed methods, the combination of hot press and cold set adhesives reduces press time whereby a disclosed veneer is under pressure no more than 2 hours, including no more than 90 minutes, such as between 60 to 120 minutes, 60 to 90 minutes, 30 to 90 minutes, 30 to 60 minutes.

At operation 2960, the continuously joined sheets, or billets, that exit the RF line may be conveyed to a flying saw. At operation 2965, any unused ends may be trimmed from the billet by the flying saw. At operation 2970, the joined panels may be cut to length by the flying saw. In some examples, at operation 2970 the joined panels may be cut to length by the flying saw and cut to a specified width by a rip saw or gang saw. In some examples, the cut-to-length and cut-to-width panels or billets may be passed between heaters or exposed to heat, to maintain a minimum temperature of 65 degrees and a maximum temperature of 100 degrees Fahrenheit. In some examples, panel temperature at a layup table will be 65 to 100 degrees, such as 65 degrees, 66 degrees, 67 degrees, 68 degrees, 69 degrees, 70 degrees, 71 degrees, 72 degrees, 73 degrees, 74 degrees, 75 degrees, 76 degrees, 77 degrees, 78 degrees, 79 degrees, 80 degrees, 81 degrees, 82 degrees, 83 degrees, 84 degrees, 85 degrees, 86 degrees, 87 degrees, 88 degrees, 89 degrees, 90 degrees, 91 degrees, 22 degrees, 93 degrees, 94 degrees, 95 degrees, 96 degrees, 97 degrees, 98 degrees, 99 degrees, or 100 degrees Fahrenheit is utilized. In one example, the panels or billets will be maintained at 90 degrees Fahrenheit. In some examples, the temperature and residence under the heaters will largely be determined by ambient temperatures to ensure a consistent substrate temperature. For example, the surrounding temperature is maintained between 65 degrees and a maximum temperature of 100 degrees Fahrenheit.

At operation 2975, the cut-to-length and cut-to-width billet may be conveyed or otherwise transferred to a sander to establish consistent thickness sizing and surface uniformity.

At operation 2980, the sanded and sized billet may be transferred through a "rip-saw" to cut the billet into appropriate widths.

At operation 2985, the cut-to-length, cut-to-width, and sized/sanded billets may be conveyed or otherwise transported to a storage area, and/or an inventory area.

At operation 2990, the billets may be stored in the inventory area for eventual delivery to one or more customers, or the billets may be transferred internally to be used to produce large format panel assemblies, as described in further detail herein.

In some example processes, the sheets may be ripped lengthwise to build billets. Cut-to-length billets may be transferred to a vacuum feeder as a variable length unit, and the vacuum feeder may be configured to separate and/or deliver pieces (e.g., sheets or billets) down a transfer chain. Additionally, the pieces may be ripped depending on whether or not the width is an interval of a whole-width sheet, or a partial-width sheet. In examples in which pieces may be ripped in multiples of four feet, one piece may be held off on the side. In examples in which the pieces may be ripped in multiples of partial width, such as two feet, waste piece may be exited from the system.

Pieces may be accumulated on the side, such as a side shift camelback chain, and the vacuum feed may be configured to deliver a plurality of sheets to create a billet. Depending on the number of layers of the eventual panel assembly construction, the billets may be delivered to a press.

In other example processes, billets may be laid-up with cut-to-length sheets. For example, lengthwise units may be placed in one feeder, and width-wise units may be placed in another feeder. The pieces, which may range in size up to width of press, may be delivered to the storage chain to build one layer of billet, for example in four-feet multiples. The length of the billet may be accumulated. Additionally, the vacuum hoist may be configured to deliver the layer to billet.

In still other examples in which the lengths of the sheets may be fixed and no inventory is required, the joined panels may be cut to length and the lengthwise pieces may be transferred to a rip saw which may be configured to cuts the pieces to the desired width. Any potential waste pieces may be dropped out of the process, or staged for another ply of the billet. The cut-to-width pieces may then continue to where the billet is built.

Lengthwise pieces may be accumulated for a lengthwise billet. The ripped billets may be split so that they end up on either side of the layer (e.g., a twelve-foot wide layer comprising two full-width billets and two partial-width billets), or one of the "split" sheets may be omitted (e.g., in the case of a ten-foot wide layer for a wall comprising two full-width billets and one partial-width billet). Cross-band pieces may be turned ninety degrees and accumulated on a separate chain. In some examples, this may be done while the layer below is being glued.

Figure 30:
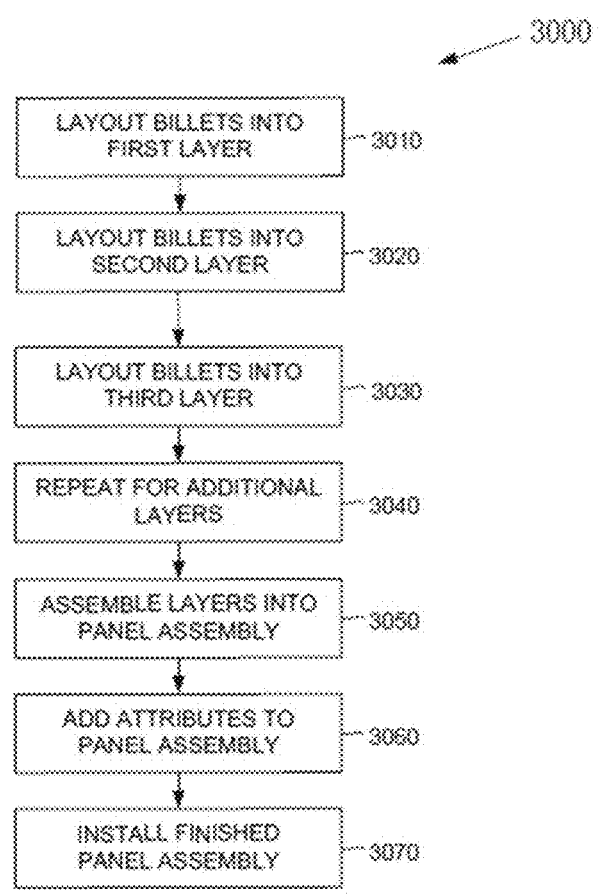
FIG. 30 illustrates an example process for manufacturing a panel assembly.

FIG. 30 illustrates an example process 3000 for manufacturing a panel assembly. At operation 3005, a number of sheets may be finger-jointed or scarf-jointed to create a continuous length panel section. In some examples, a first panel section may be prepared as a longitudinal panel section and a second panel section may be prepared as a transverse panel section. Additionally, for plywood sheets comprising a wood grain, one or more of the panel sections may be prepared for longitudinal grain applications and/or cross-grain applications. Additionally, one or more of the billets referenced in the following operations may be manufactured according to one or more operations of the process 2900 illustrated in FIG. 29.

At operation 3010, a first set of billets may be laid into a mat or layer. The layer may comprise three or more billets placed side by side for applications involving longitudinally oriented billets. For example, the layer may measure twelve feet wide by forty feet long.

At operation 3020, a second set of billets may be laid into a second mat or second layer. The layer may comprise three or more billets placed side by side for applications involving longitudinally oriented billets. For example, the second layer may also measure twelve feet wide by forty feet long. In example panel assemblies configured with cross-grain applications, the second layer may comprise a number of transverse billets, oriented perpendicular to the longitudinal billets in the first layer.

At operation 3030, a third layer configured similar to the first layer may be laid upon the second layer for those panels which include more than two layers.

At operation 3040, one or more of the previous operations may be repeated until the panel assembly has the desired thickness and/or desired structural configuration.

At operation 3050, an adhesive, such as an ANSI approved cold-press glue, may be applied on each layer within the panel assembly. In example panel assemblies such as those used for a wall, the panel assembly may be constructed with cross-grain direction first for structural and/or cosmetic reasons.

At operation 3060, panel assemblies which are manufactured as finished floor and/or wall panels may pass through a CAD operated mass timber router. The router may cut into the panel assembly certain types of attributes, such as windows and door openings, electrical chases, connection joints, etc.

At operation 3070, the finished panel assembly may be installed into a building as a pre-fabricated structure.

In example panel assemblies in which plywood may be used as a base commodity product, the amount of waste involved with certain types of joint operations and cutting out large knots or other defects which might otherwise occur from working with a lumber board, may be decreased. In examples in which veneer may be used in a plywood panel, the defect sizes within a panel may be limited by the knot size, as opposed to a knot running the full width or full thickness, as may occur in a lumber panel.

The standardized sizes of a plywood panel lends to easy manufacturing processes with fewer pieces as compared to a lumber produced panel. Additionally, by reducing or spreading out the effects of any wood defects throughout the plywood panel, less wood fiber may be required in construction of the panel assembly in comparison to lumber produced cross-laminated timber panel.

The number of veneer lines within a panel assembly may be configured in an almost unlimited number of panel layup variations. In some examples, specific veneers may be chosen based upon wood density characteristics, and different veneer species may be chosen for different applications or cost constraints. For example, hemlock (which may be considered a relatively lower cost veneer) may be used for some applications, while Douglas fir (which may be considered a relatively higher cost veneer) may be used for other applications. Additionally, the face grade of visible veneer layer may be individually selected for each panel assembly and/or application, such as using an A-grade face, C-grade back Exterior (ACX) panel to provide a knot-free visible layer.

In some examples, the base commodity panel may comprise a nine-ply veneer panel. The panel may comprise one-eighth inch Douglas fir; however, other types of wood species may also be used depending on the regional availability and/or particular desired characteristics of the panel. The veneers used within C-grade face, D-grade back Exterior (CDX) panels, or in parallel veneer produced panels, do not necessarily need to be specifically chosen for density graded characteristics, although the opportunity to use specialized veneers for greater structural integrity is available.

Due to the vertical loading of wall panels, CDX panels may be laid up and cold pressed together without glue layers perpendicular to the primary glue line direction of the plywood panels. The number of plies used to construct the wall panels may be based upon the desired structural requirements, or the dimension requirements of the application. An example panel assembly may be constructed entirely of four feet by eight and one-eighth inch thick veneers with wood grain running in predominately parallel direction, and the panel assembly may additional comprise one or two cross-banded lateral veneers for dimensional stability.

As with laminated veneer lumber panels, veneer panels such as those manufactured for floor panels, may have additional structural strength when applied to vertical fiber. To create a stronger floor panel, plywood panels may be "ripped" through a panel saw into required widths for structural application. The ripped pieces may be stood up on end and edge glued together into a panel, such as a four-foot wide by eight-foot long panel. The thickness of the panel may be determined based on the ripped width of plywood sheets. These panels may then be used as a core within a mass timber panel between either LVL based panels or CDX based plywood panels. While the glue-line may be placed perpendicular to the panel plane in some examples, the alternating grain direction of the plywood panel may be used to create an alternating grain direction within this core line.

Some example types of veneer may be readily produced as thin as one-tenth inches in thickness. Any defects and/or material variations within the veneer may be spread through the sheet, compared to large knots found in lumber. Additionally, the panels may be designed to accommodate pressures that exceed one hundred and seventy-five pounds per square inch.

As compared to timber products, engineered panels constructed out of veneer may experience significantly less cupping or warping, and may provide more design flexibility in panel thickness and layup configurations. In some examples, cross-banding and/or cross-grain structural features may be achieved or built in via the panel constructions process.

As discussed above, the desired finished panel dimensions may be made variable according to customer specification or desired characteristics of the finished product. In some examples, the panel assembly may be configured as a mass timber panel in a general dimension of twelve feet wide by forty feet long, by any desired thickness. In some examples, the panel assembly may conform to the conventional thicknesses of cross-laminated timber panels, for example having a maximum thickness of twenty inches and a minimum thickness of four and one-half inches. In some examples, the panel thickness may have a maximum thickness of twenty-four inches. In some examples, the panel thickness may have a minimum thickness of one inches. In some examples, the panel thickness may have a maximum thickness between about twelve and twenty-four inches. In some examples, the panel thickness may have a maximum thickness of between about twenty-four inches and about thirty-six inches. For example, the minimum thickness is one inch and the maximum is 24 inches. In some examples, the minimum thickness is at least 8 inches, such as at least 8 inches, at least 12 inches, at least 16 inches, at least 20 inches, or at least 24 inches. In some examples, the minimum thickness is one inch and the maximum thickness is 48 inches. Example panel assemblies comprising veneer laminated timber with additional construction specification details are provided in the below tables and descriptions. The disclosed SCL arrangement allows an all parallel veneer layup without alternating the direction of the primary lamellas and still achieving necessary force direction strength (long-span bending and minor force direction (cross-span bending). The disclosed panels alleviate the problem that CLT suffers from of requiring odd-lamella layers to achieve strength in both directions. For example, the addition of 2 cross-bands (or 1, or 4) on each lamella allows one to achieve the 1 inch lamellas to more closely engineer the layers for overall strength.

The disclosure is further illustrated by the following non-limiting Examples.

EXAMPLES

Provided below are exemplary dimensions for disclosed panel assemblies.

| Veneer Laminated Timber | | | |
|---|---|---|---|
| Example Layup and Glue Surface Area | | Ply Thickness-Inches | Glue Surface Area-ft^2 |
| Panel # | 101 3-Ply | prior to comperession | |
| | 1" 9-ply ⅛ CDX Layup | 1 | |
| | ⅝" 5-ply CDX | 0.625 | 32 |
| | 1" 9-ply ⅛ CDX Layup | 1 | 32 |
| | 23 plies | 2.625 | 64 |
| Panel # | 102 5-ply | | |
| | 1" 9-ply ⅛ CDX Layup | 1 | |
| | ½" 5-ply CDX | 0.5 | 32 |
| | 1" 9-ply ⅛ CDX Layup | 1 | 32 |
| | ½" 5-ply CDX | 0.5 | 32 |
| | 1" 9-ply ⅛ CDX Layup | 1 | 32 |
| | 37 plies with 1/10 core lines | 4 | 128 |

Veneer Laminated Timber

| Example Layup and Glue Surface Area | | Ply Thickness-Inches | Glue Surface Area-ft^2 |
|---|---|---|---|
| Panel # | 103 5-ply | | |
| | 1" LVL | 1 | |
| | ⅝" 5-ply CDX | 0.625 | 32 |
| | 1" LVL | 1 | 32 |
| | ⅝" 5-ply CDX | 0.625 | 32 |
| | 1" LVL | 1 | 32 |
| | 37 plies | 4.25 | 128 |
| Panel # | 104 5-ply | | |
| | 1" 9-ply ⅛ CDX Layup | 1 | |
| | ⅝" 5-ply CDX | 0.625 | 32 |
| | 1" 9-ply ⅛ CDX Layup | 1 | 32 |
| | ⅝" 5-ply CDX | 0.625 | 32 |
| | 1" 9-ply ⅛ CDX Layup | 1 | 32 |
| | 37 plies | 4.25 | 128 |
| Panel # | 105 5-ply | | |
| | 1" 9-ply ⅛ CDX Layup | 1 | |
| | 3.5" Edge Glued ⅝" CDX | 3.5 | 32 |
| | ¾" CDX 5-ply | 0.75 | 187 |
| | 3.5" Edge Glued ⅝" CDX | 3.5 | 32 |
| | 1" 9-ply ⅛ CDX Layup | 1 | 187 |
| | | 9.75 | 438 |
| Panel # | 106 5-ply | | |
| | 1" 9-ply ⅛ CDX Layup | 1 | |
| | 2¼" Edge glued ⅝" CDX | 2.25 | 32 |
| | ¾" CDX 5-ply | 0.75 | 107 |
| | 2¼" Edge glued ⅝" CDX | 2.25 | 32 |
| | 1" 9-ply ⅛ CDX Layup | 1 | 107 |
| | | 7.25 | 278 |
| Panel # | 107 7-ply | | |
| | ⅝" 5-ply CDX | 0.625 | |
| | ⅝" 5-ply CDX | 0.625 | 32 |
| | ⅝" 5-ply CDX | 0.625 | 32 |
| | ⅝" 5-ply CDX | 0.625 | 32 |
| | ⅝" 5-ply CDX | 0.625 | 32 |
| | ⅝" 5-ply CDX | 0.625 | 32 |
| | ⅝" 5-ply CDX | 0.625 | 32 |
| | 35 plies | 4.375 | 192 |
| Panel # | 108 5-ply | | |
| | 1" LVL | 1 | |
| | 1" 9-ply ⅛ CDX Layup | 1 | 32 |
| | 1" LVL | 1 | 32 |
| | 1" 9-ply ⅛ CDX Layup | 1 | 32 |
| | 1" LVL | 1 | 32 |
| | | 5 | 128 |
| Panel # | 109 5-ply | | |
| | 1" 9-ply ⅛ CDX Layup | 1 | |
| | 1" LVL | 1 | 32 |
| | 1" 9-ply ⅛ CDX Layup | 1 | 32 |
| | 1" LVL | 1 | 32 |
| | 1" 9-ply ⅛ CDX Layup | 1 | 32 |
| | | 5 | 128 |
| | Total Inches Pressed | 46.5 | |
| | Total Glue Surface | | 1484 |

In some examples, F-22MPP are designed in accordance with ANSI/APA PRG 320-2012, American National Standard "Standard for Performance-Rated Cross Laminated Timber," and FP Innovations, Pointe Claire, QC, Special Publication SP-529E, "The CLT Handbook." For example, laminations are 0.995" thick laminated veneer lumber (LVL) and plywood (PLVL). The 2.2 E LVL and 1.0 E PLVL laminations are designed per ASTM 5456-14b "Standard Specification for Evaluation of Structural Composite Lumber." To adjust Effective $EI_{EFF}$ to Apparent $EI_{APP}$ to account for loading conditions, the following equation was used: $EI_{APP}=EI_{EFF}/(1+(K_S EI_{EFF}/GA_{EFF}*L^2)$ where KS=Constant based upon shear deformation and loading condition; L=Span; and R-Value for F-22MPP is 1.25 per inch. The F-22MPP meets or exceed the performance of a standard CLT for Sound Transmission Class (STC), Field Sound Transmission Class (FSTC), Impact Insulation Class (IIC) and Field Impact Insulation Class (FIIC). Per the CLT Handbook: Bare CLT floors will not meet the International Building Code (IBC) requirements for FSTC and FIIC; therefore, floor assemblies will be required.

The following exemplary tables designate loading in major force direction only.

F-22MPP Exemplary Engineering Specifications

| | 4" MPP | 5" MPP | 6" MPP | 7" MPP | 8" MPP |
|---|---|---|---|---|---|
| | F22 SCL | F22 SCL | F22 SCL | F22 SCL | F22 SCL |
| | F10 SCL | F22 SCL | F22 SCL | F22 SCL | F22 SCL |
| | F10 SCL | F10 SCL | F10 SCL | F10 SCL | F10 SCL |
| | F10 SCL | F10 SCL | F10 SCL | F10 SCL | F10 SCL |
| | F22 SCL | F22 SCL | F22 SCL | F22 SCL | F22 SCL |
| | | F22 SCL | F22 SCL | F22 SCL | F22 SCL |
| | | | F22 SCL | F22 SCL | F22 SCL |
| Effective Stiffness $EI_{EFF}$ ($\times 10^6$ lbf-in²/ft) | 129 | 269 | 458 | 711 | 1,034 |
| Shear Modulus $GA_{EFF}$ ($\times 10^6$ lbf/ft) | 2.3 | 5.05 | 5.5 | 6.15 | 6.82 |
| Moment Capacity $F_B S_{EFF}$ (lbf-ft/ft) | 6,675 | 11,150 | 15,825 | 21,025 | 26,750 |

|  | 4" MPP<br>F22 SCL<br>F10 SCL<br>F10 SCL<br>F22 SCL | 5" MPP<br>F22 SCL<br>F10 SCL<br>F22 SCL<br>F22 SCL | 6" MPP<br>F22 SCL<br>F10 SCL<br>F22 SCL<br>F22 SCL | 7" MPP<br>F22 SCL<br>F10 SCL<br>F10 SCL<br>F22 SCL | 8" MPP<br>F22 SCL<br>F10 SCL<br>F10 SCL<br>F22 SCL |
|---|---|---|---|---|---|
| Shear Capacity Fs (lb/Q)$_{EFF}$ | 1,775 | 1,850 | 2,125 | 2,575 | 3,075 |
| Actual Thickness (inches) | 3.98 | 4.975 | 5.97 | 6.965 | 7.96 |
| Pounds per Cubic Footage | 37.44 | 37.44 | 37.44 | 37.44 | 37.44 |
| Pounds per Lineal Foot/Foot of Width | 12.42 | 15.52 | 18.63 | 21.73 | 24.84 |

| Depth | 10 Foot Span Live Load | Total Load | 12 Foot Span Live Load | Total Load | 14 Foot Span Live Load | Total Load | 16 Foot Span Live Load | Total Load | 18 Foot Span Live Load | Total Load |
|---|---|---|---|---|---|---|---|---|---|---|
| 4" | 135 | 205 | 80 | 120 | 50 | 75 | 35 | 50 | 20 | 35 |
| 5" | 205 | 370 | 165 | 250 | 105 | 160 | 70 | 105 | 50 | 75 |
| 6" | — | 425 | 275 | 350 | 180 | 265 | 120 | 180 | 85 | 125 |
| 7" | — | 515 | — | 430 | 275 | 365 | 185 | 275 | 130 | 195 |
| 8" | — | 615 | — | 510 | 390 | 435 | 265 | 380 | 190 | 285 |

| Depth | 20 Foot Span Live Load | Total Load | 22 Foot Span Live Load | Total Load | 24 Foot Span Live Load | Total Load | 26 Foot Span Live Load | Total Load | 28 Foot Span Live Load | Total Load |
|---|---|---|---|---|---|---|---|---|---|---|
| 4" | 10 | 25 | — | — | — | — | — | — | — | — |
| 5" | 35 | 55 | 20 | 40 | — | — | — | — | — | — |
| 6" | 60 | 90 | 45 | 70 | 30 | 50 | 20 | 40 | — | — |
| 7" | 95 | 140 | 70 | 105 | 55 | 80 | 40 | 65 | 25 | 50 |
| 8" | 140 | 210 | 105 | 155 | 80 | 120 | 60 | 95 | 45 | 75 |

(in pounds per lineal foot)

Engineering Comparison: F-22MPP Vs E-2CLT

| F-22MPP Span Table | | |
|---|---|---|
| Thickness | L/480 | L/360 |
| 4" | 15'-3" | 16'-9" |
| 5" | 19'-6" | 21'-6" |
| 6" | 23'-4" | 25'-4" |
| 7" | 27'-4" | 29'-8" |
| 8" | 30'-6" | 32'-4" |

| E-2 CLT Span Table | | |
|---|---|---|
| Thickness | L/480 | L/360 |
| 4.125" | 13'-10" | 15'-3" |
| 6.875" | 21'-9" | 24'-0" |
| 9.625" | 29'-6" | 32'-4" |

| | Ratio CLT to F-22MPP | |
|---|---|---|
| Product Thickness | Span Length L/480 | Span Length L/360 |
| | 97% | 110% | 110% |
| | 87% | 107% | 106% |
| | 83% | 103% | 100% |

In one specific example, a standard panel configuration may be 9-ply ⅛ Douglas fir veneer joined to four feet by 8 feet panels joined together by a resin, such as phenolic-formaldehyde resin in a hot press. An exemplary panel configuration is as follows (G representing a density graded veneer):

2.2E SCL (structural composite lumber)
    G1 parallel
    G1 parallel
    G2 parallel
    G3 cross-band
    G2 parallel
    G3 cross-band G2 parallel
G1 parallel
G1 parallel
1.0E SCL
G3 parallel
G3 cross-band
G3 parallel
G3 cross-band
G3 parallel
G3 cross-band
G3 parallel
G3 cross-band
G3 parallel It is contemplated that 1.55E SCL and other E (bending designated) lamellas could be used. Products are constructed of varying configurations of 2.2 E and 1.0 E lamellas all at one-inch thickness. As illustrated in FIG. 31, the top row indicates overall Mass Timber Panel Thickness and cells indicate panel grade for each one-inch thick lamella. It is contemplated that up to 60 inch thickness panels can be formed, such as up to 24 inch, 30 inch, 36 inch, 40 inch, 42 inch, 48 inch, 54 inch or 60 inch panels, including 24 inch, 30 inch, 32 inch, 36 inch, 40 inch, 42 inch, 48 inch, 54 inch or 60 inch panels can be formed.

Figure 32:
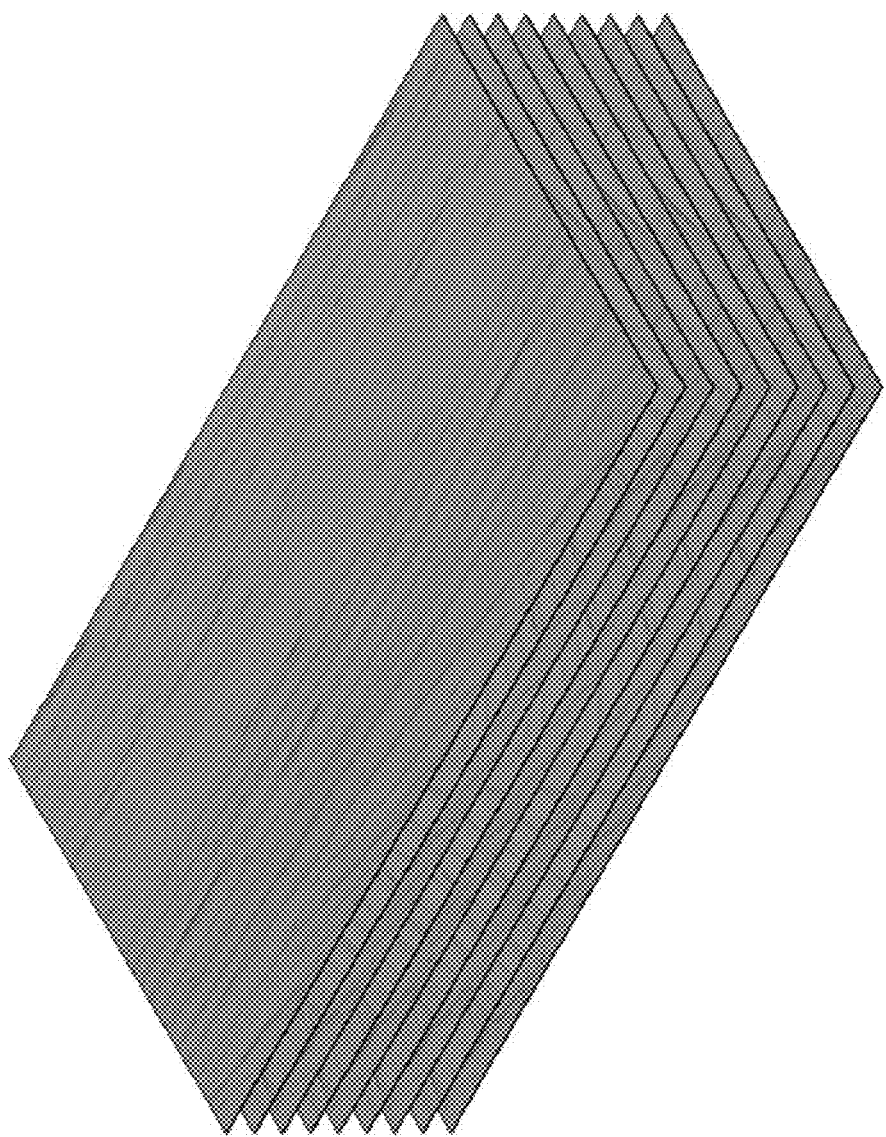
FIG. 32 is an isometric view of an example of a SCL panel layout.
Figure 33:
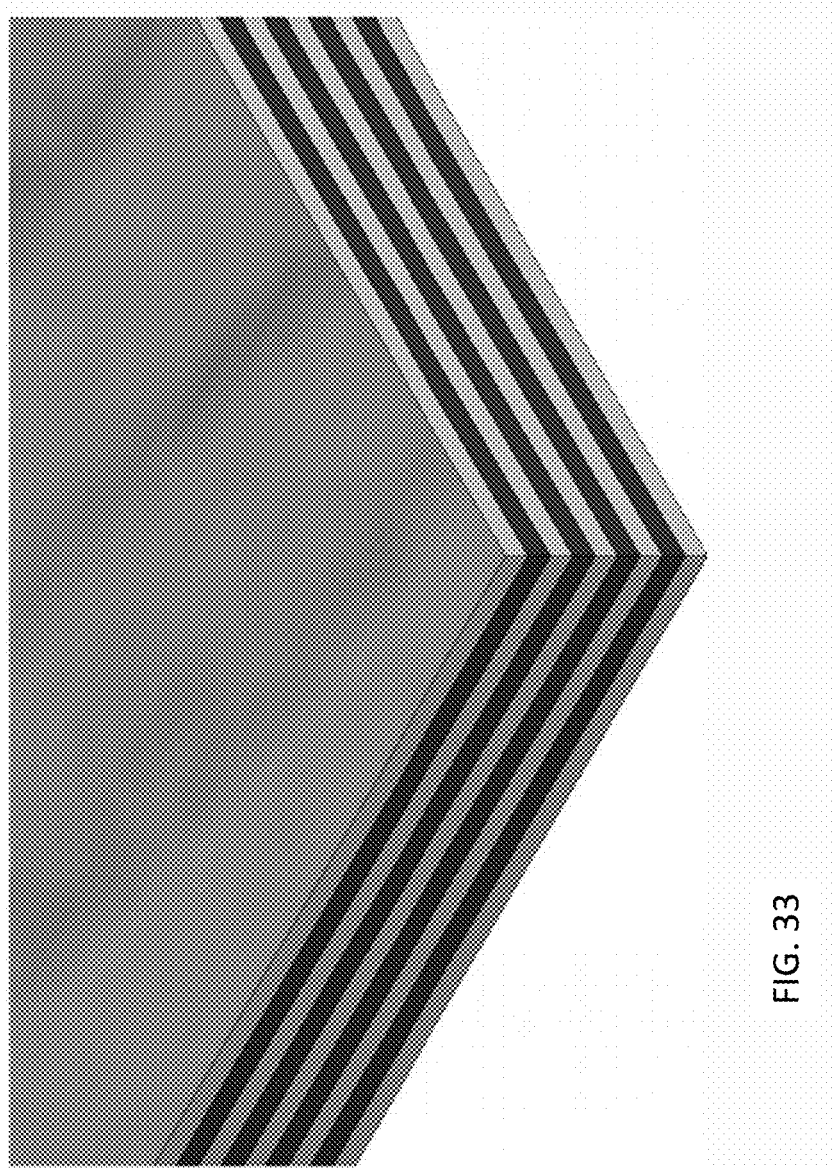
FIG. 33 is a close-up isometric view of an example of a SCL panel layout.
Figure 34:
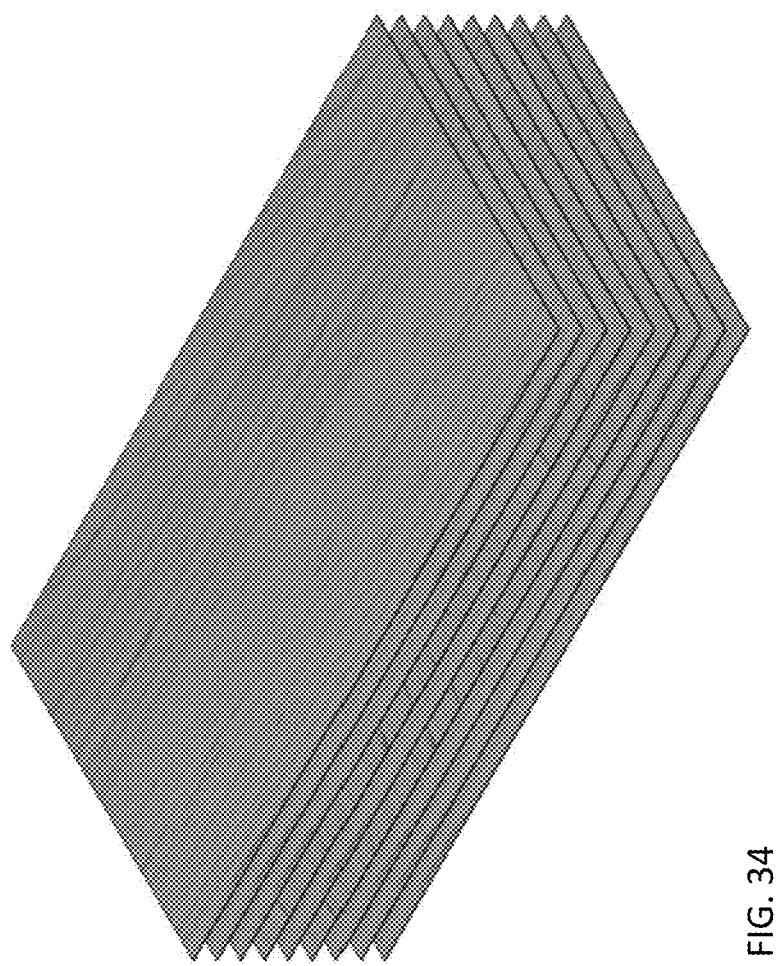
FIG. 34 is an isometric view of an example of a SCL panel layout.
Figure 35:
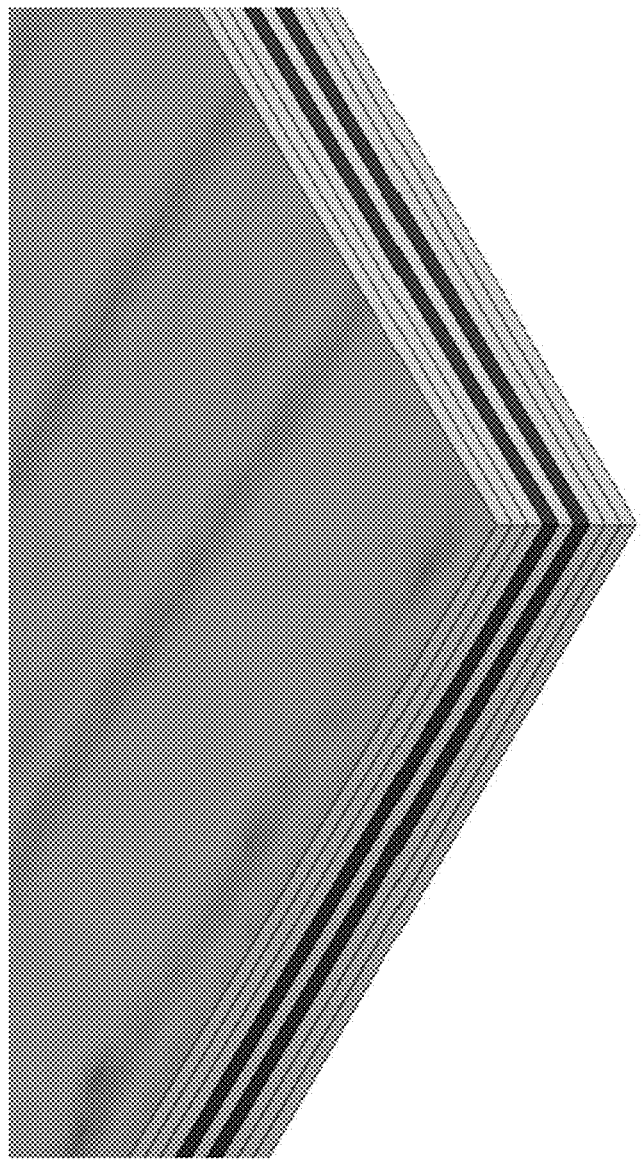
FIG. 35 is a close-up isometric view of an example of a SCL panel layout.
Figure 36:
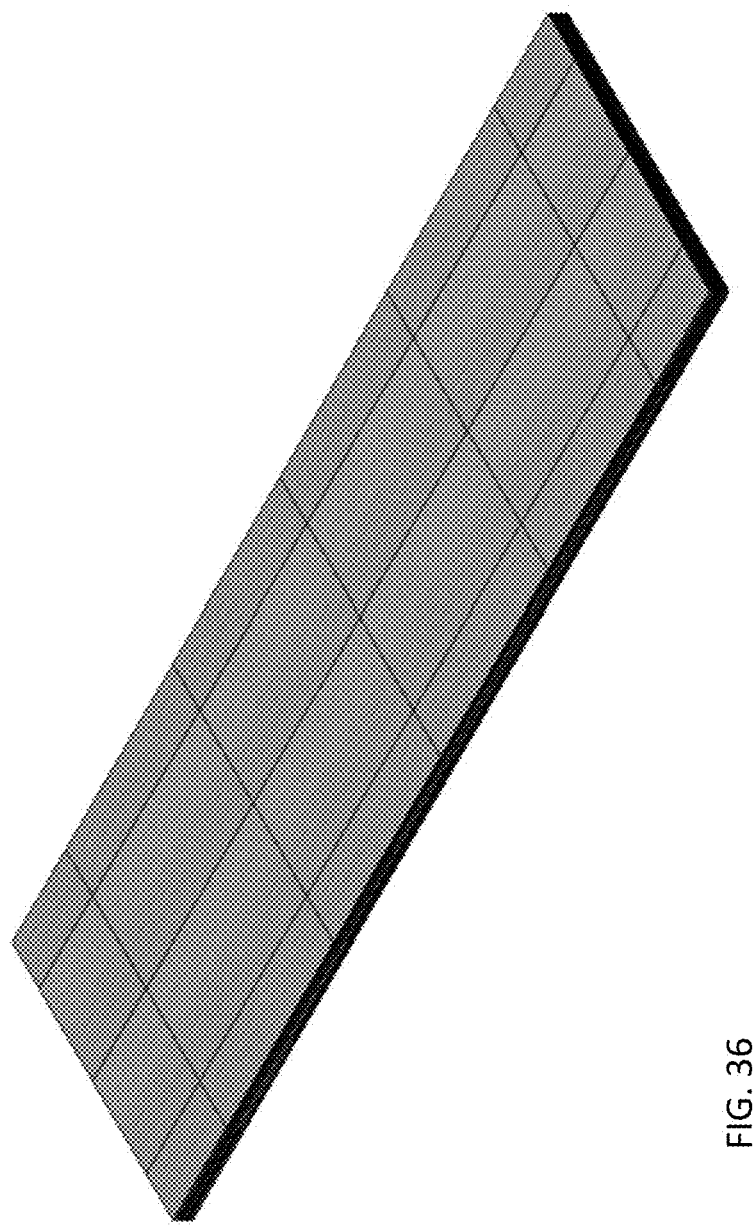
FIG. 36 is an isometric view of an example of a SCL panel assembly in accordance with an embodiment disclosed herein.
Figure 37:
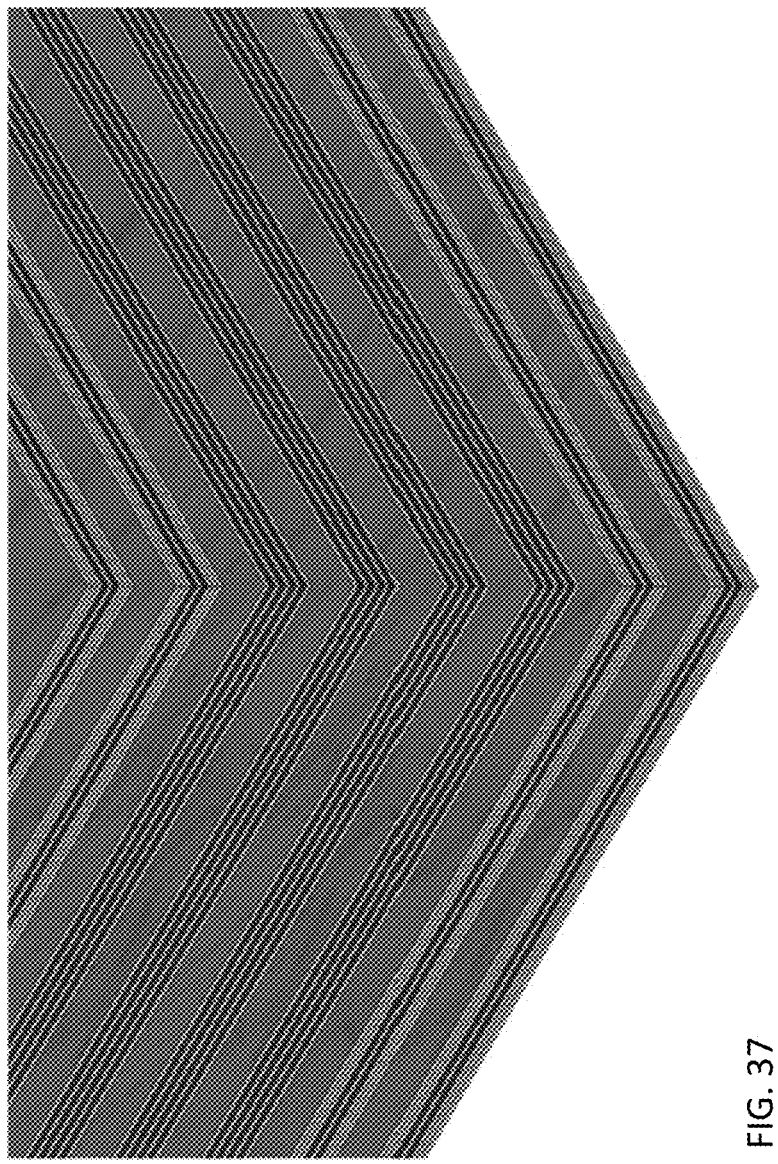
FIG. 37 is a close-up isometric view of an example of a SCL panel layout.
Figure 38:
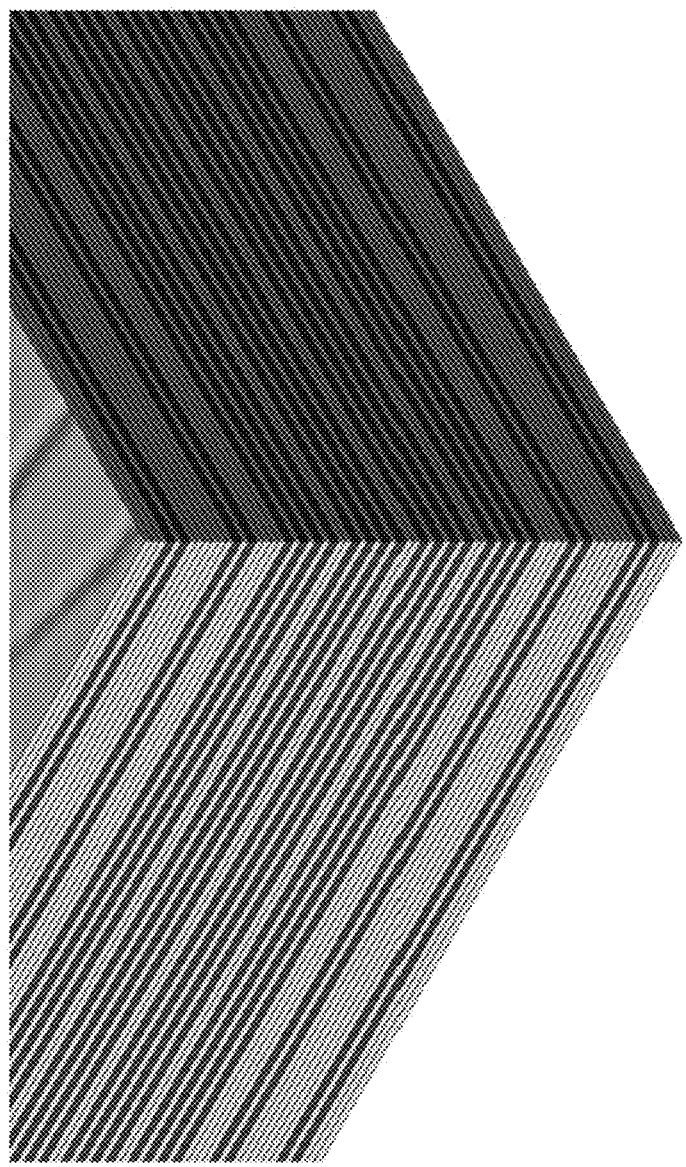
FIG. 38 is a close-up isometric view of an example of a SCL panel layout.
Figure 39:
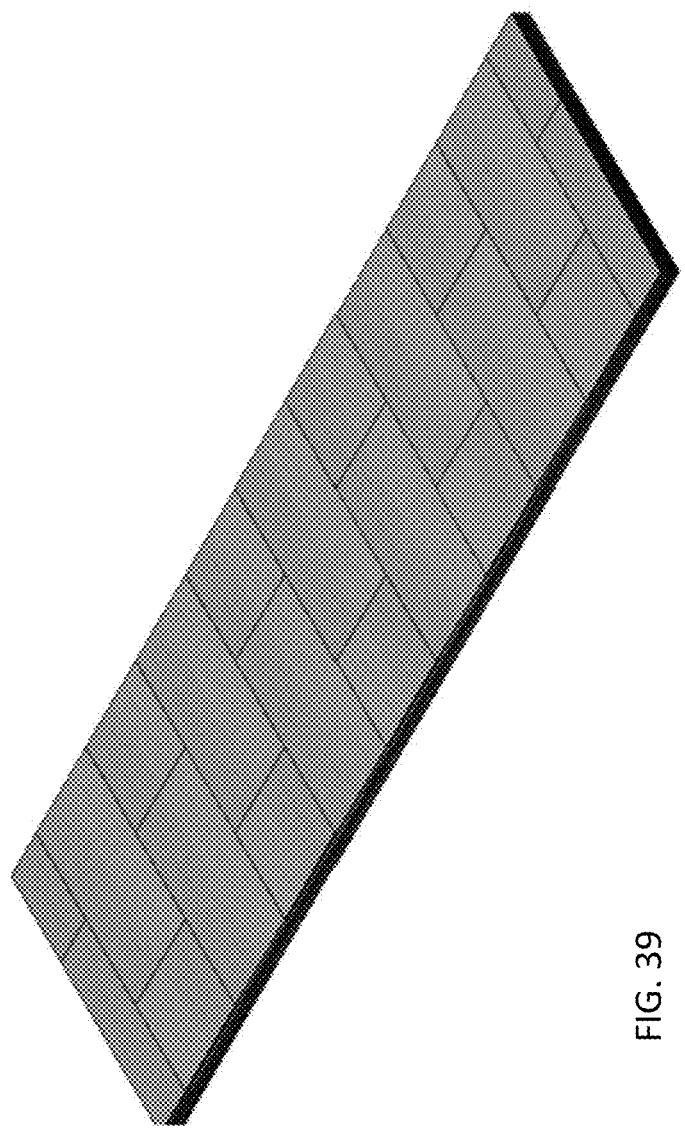
FIG. 39 is an isometric view of an example of a SCL panel assembly in accordance with an embodiment disclosed herein.
Figure 40:
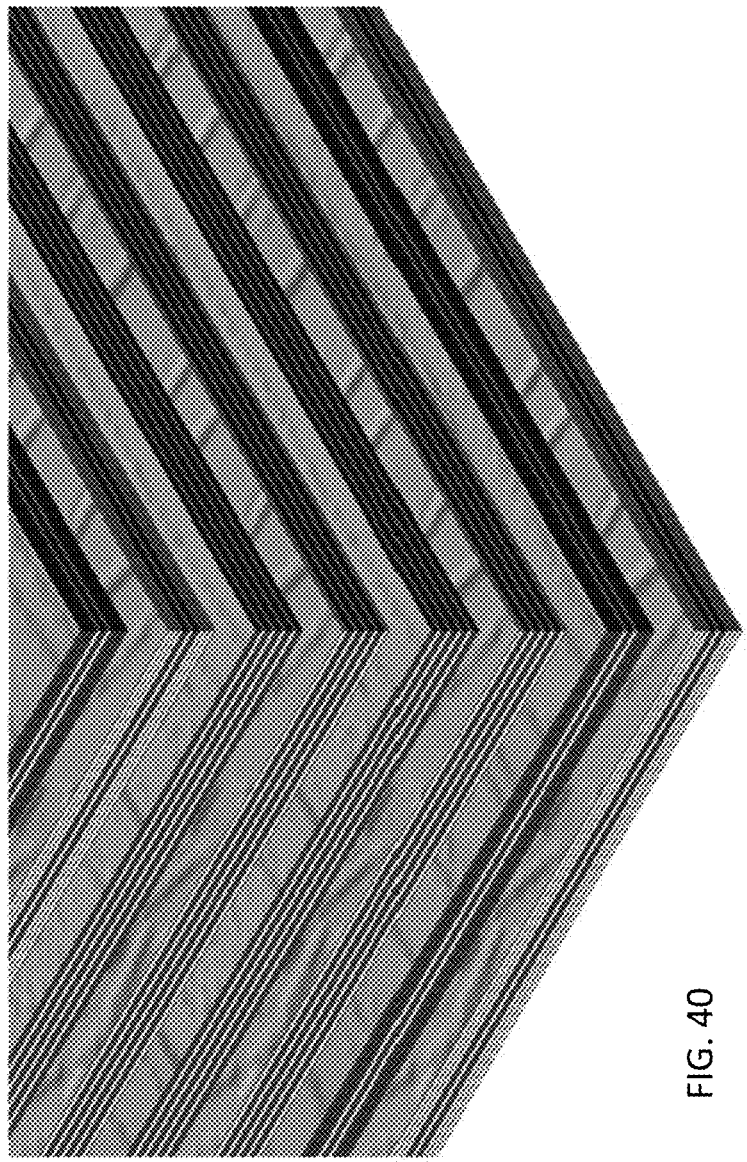
FIG. 40 is a close-up isometric view of an example of a SCL panel layout.
Figure 41:
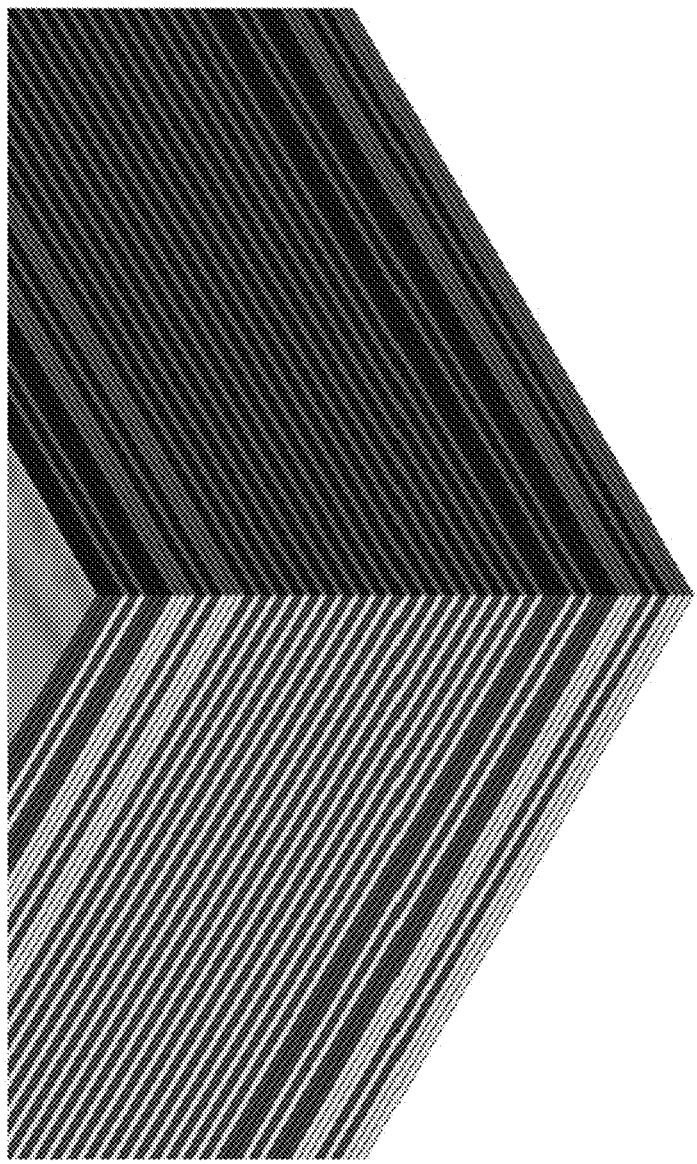
FIG. 41 is a close-up isometric view of an example of a SCL panel layout.

FIGS. 32-41 illustrate exemplary SCL embodiments. For example, FIG. 32 illustrates 1.0E lamella alternating long-grain veneer/cross-grain veneer throughout panel-uncompressed while FIG. 33 provides 1.0E lamella compressed detail indicating alternating layup. FIG. 34 illustrates 2.2E lamella three long-grain veneers, cross grain veneer, long-grain veneer, cross grain veneer, and three long grain veneers uncompressed. FIG. 35 shows 2.2E lamella compressed detail indicating 7 long grain and 2 cross band layup. FIG. 36 demonstrates transition to describing 8 inch F22 MPP in all long panel configuration. FIG. 37 shows an 8 inch F22 MPP Construction with 2 quantity 2.2E top, 4 quantity 1.0E interior, and 2 quantity 2.2 E bottom panel configuration. FIG. 38 illustrates an 8 inch F22 MPP Parallel Construction. FIG. 39 indicates transition to describing alternating 4 foot wide panel configuration in a cross direction format. FIG. 40 provides an 8 inch F22 MPP Construction with 2 quantity 2.2E top, 4 quantity 1.0E interior, and 2 quantity 2.2 E bottom. FIG. 41 illustrates an 8 inch F22 MPP Orthogonal Construction embodiments.

Having described and illustrated example assemblies and methods, it should be apparent that modifications in arrangement and detail may exist without departing from the principles disclosed herein. Accordingly, it should be understood that that any protection granted is not limited by the disclosure, but extends to any and all modifications and variations falling within the spirit and scope of the following claims.

The invention claimed is:

1. A mass plywood panel assembly, comprising:
at least two engineered wood panel assemblies, each wood panel assembly, comprising:
a first layer including a first set of billets that abut against each other along a lengthwise edge of the billets, wherein each billet comprises a joint connecting adjacent sheets within the billet, wherein the joint is oriented perpendicular to the lengthwise edge, and wherein each of the sheets in the first layer includes a number of veneer plies with at least one ply comprising wood grain oriented in a first direction;
a second layer including a second set of billets of sheets that are layered on top of the first layer, wherein each billet in the second set comprises an additional joint connecting adjacent sheets, wherein the additional joint is oriented perpendicular to a lengthwise edge of the second set of billets, wherein the additional joint in the second layer is offset from the joint in the first layer, and wherein each of the sheets in the second layer includes a number of veneer plies with at least one ply comprising wood grain oriented in a second direction perpendicular to the first direction; and
a third layer including a third set of billets of sheets that are layered on top of the second layer and include a number of veneer plies with at least one ply comprising wood grain oriented in the first direction, wherein each billet in the third set comprises another joint connecting adjacent sheets, and wherein the other joint in the third layer is offset from both the additional joint in the second layer and the joint in the first layer;
wherein the first set of billets, the second set of billets, and the third set of billets are all oriented longitudinally along the length of the wood panel assembly and the at least two engineered wood panel assemblies are connected by an end joint, thereby forming the mass plywood panel assembly.

2. The assembly of claim 1, wherein each billet in the first layer comprises two or more joints that connect three or more adjacent sheets within the billet, wherein each billet in the second layer comprises two or more joints, wherein each billet in the third layer also comprises two or more joints, and wherein all of the joints in the first layer, the second layer, and the third layer are longitudinally offset from each other.

3. The assembly of claim 1, wherein the first set of billets comprises a number of rows of billets consisting of whole-width sheets, wherein the second set of billets comprises at least one billet consisting of partial-width sheets, and wherein the lengthwise edge of the second set of billets is laterally offset from the lengthwise edge of the first set of billets according to a width of the partial-width sheets.

4. The assembly of claim 3, wherein the width of the partial-width sheets is approximately half of the whole-width sheets, and wherein the second set of billets comprises two partial-width sheets.

5. The assembly of claim 1, wherein the first layer, the second layer, and the third layer have identical widths and lengths, and wherein a thickness of the wood panel assembly is based on a number of layers used to manufacture the wood panel assembly including a combined thickness of the first layer, the second layer, and the third layer.

6. The assembly of claim 1, wherein each of the sheets in the second layer includes at least one ply comprising wood grain oriented orthogonally to the second layer in a third direction that is perpendicular to both the first direction and the second direction.

7. The assembly of claim 1, wherein the end joint is a scarf joint.

8. The assembly of claim 1, wherein the mass panel assembly is longer than 12 feet, thicker than 2 inches and wider than 5 feet.

\* \* \* \* \*